United States Patent
Schmuck et al.

(10) Patent No.: US 10,388,958 B2
(45) Date of Patent: Aug. 20, 2019

(54) ELECTRODE FOR AN ELECTROCHEMICAL ELEMENT WITH AN ORGANIC ELECTROLYTE, ELECTROCHEMICAL ELEMENTS COMPRISING THE ELECTRODE AND POLYMERIC MATERIAL AND ITS USE AS ELECTRODE ACTIVE MATERIAL OR AS ELECTRODE BINDER

(71) Applicants: VARTA Micro Innovation GmbH, Graz (AT); Technische Universität Graz, Graz (AT); Polymer Competence Center Leoben GmbH, Leoben (AT)

(72) Inventors: Martin Schmuck, Graz (AT); Harald Kren, Graz (AT); David E. Fast, Graz (AT); Robert Saf, Graz (AT); Franz Stelzer, Graz (AT); Katharina Gallas, St. Lorenzen (AT)

(73) Assignees: VARTA Micro Innovation GmbH, Ellwangen, Jagst (DE); Technische Universität Graz, Graz (AT); Polymer Competence Center Leoben GmbH, Leoben (AT)

(*) Notice: Subject to any disclaimer, the term of this patent is extended or adjusted under 35 U.S.C. 154(b) by 0 days.

(21) Appl. No.: 15/531,769

(22) PCT Filed: Nov. 23, 2015

(86) PCT No.: PCT/EP2015/077346
§ 371 (c)(1),
(2) Date: May 31, 2017

(87) PCT Pub. No.: WO2016/091569
PCT Pub. Date: Jun. 16, 2016

(65) Prior Publication Data
US 2017/0263934 A1  Sep. 14, 2017

(30) Foreign Application Priority Data

Dec. 10, 2014 (EP) .................................. 14197166

(51) Int. Cl.
*H01M 4/00* (2006.01)
*C08G 69/32* (2006.01)
(Continued)

(52) U.S. Cl.
CPC ............ *H01M 4/606* (2013.01); *C08G 69/32* (2013.01); *C08G 73/026* (2013.01);
(Continued)

(58) Field of Classification Search
CPC .... H01M 4/606; H01M 4/364; H01M 4/5825; H01M 4/623; H01M 4/625;
(Continued)

(56) References Cited

U.S. PATENT DOCUMENTS 6,514,431 B1 * 2/2003 Nishikitani ............ H01B 1/122
                                                          252/500
8,304,514 B2  11/2012 Liaw

FOREIGN PATENT DOCUMENTS

EP     2 025 689 A1    2/2009
WO    2010/051259 A1    5/2010

OTHER PUBLICATIONS

Liou et al. "Highly Stable Anodic Electrochromic Aromatic Polyamides Containing N,N,N',N'-Tetraphenyl-p-Phenylenediamine Moieties: Synthesis, Electrochemical, and Electrochromic Properties". Macromolecules 2008, 41, 1667-1674. Published Feb. 9, 2008. Total pp. 8.*

(Continued)

*Primary Examiner* — Harold Y Pyon
*Assistant Examiner* — Danny N Kang
(74) *Attorney, Agent, or Firm* — DLA Piper LLP (US)

(57) ABSTRACT

An electrode for an electrochemical element with an organic electrolyte includes a polymeric material containing or composed of subunits according to general formulae (I) and/or (II):

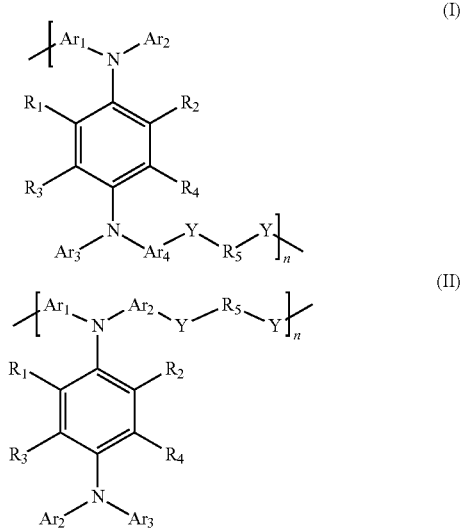

wherein n is an integer ≥2, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl (preferably —$CH_3$, —$C_2H_5$), Alkoxy-(preferably —$OCH_3$, —$OC_2H_5$), -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in structures (I) and (II) independently represent a bridging aryl group.

20 Claims, 3 Drawing Sheets

(51) Int. Cl.

| | | |
|---|---|---|
| C08L 1/00 | (2006.01) |
| H01G 11/00 | (2013.01) |
| H01M 4/60 | (2006.01) |
| H01G 11/30 | (2013.01) |
| H01G 11/48 | (2013.01) |
| H01M 4/36 | (2006.01) |
| H01M 4/62 | (2006.01) |
| H01G 11/32 | (2013.01) |
| C08G 73/02 | (2006.01) |
| C08L 79/02 | (2006.01) |
| H01M 10/0525 | (2010.01) |
| C08L 77/10 | (2006.01) |
| H01M 4/58 | (2010.01) |
| C08K 3/04 | (2006.01) |
| C08L 27/16 | (2006.01) |
| C08L 33/02 | (2006.01) |
| H01M 4/02 | (2006.01) |

(52) U.S. Cl.
CPC .............. *C08G 73/028* (2013.01); *C08K 3/04* (2013.01); *C08L 1/00* (2013.01); *C08L 27/16* (2013.01); *C08L 33/02* (2013.01); *C08L 77/10* (2013.01); *C08L 79/02* (2013.01); *H01G 11/30* (2013.01); *H01G 11/32* (2013.01); *H01G 11/48* (2013.01); *H01M 4/364* (2013.01); *H01M 4/5825* (2013.01); *H01M 4/608* (2013.01); *H01M 4/622* (2013.01); *H01M 4/623* (2013.01); *H01M 4/625* (2013.01); *H01M 10/0525* (2013.01); *C08K 3/041* (2017.05); *C08K 3/042* (2017.05); *C08L 2203/20* (2013.01); *H01M 2004/028* (2013.01); *Y02E 60/13* (2013.01)

(58) Field of Classification Search
CPC ........ H01M 10/0525; H01M 2004/028; C08G 69/32; C08L 77/10; C08L 2203/20; H01G 11/32; H01G 11/48
USPC ....................................................... 252/500
See application file for complete search history.

(56) References Cited

OTHER PUBLICATIONS

Guey-Sheng Liou et al., "Electrochemical behavior of N,N,N',N'-tetraphenyl-1,4-phenylenediamine moiety on novel aromatic polyamides and their electrochromic properties," Dyes and Pigments, Elsevier, vol. 74, No. 2, Feb. 2, 2007, pp. 273-278.

Guey-Sheng Liou et al., "Highly Stable Anodic Electrochromic Aromatic Polyamides Containing N,N,N',N'-Tetraphenyl-p-Phenylenediamine Moieties: Synthesis, Electrochemical, and Electrochromic Properties," Macromolecules, vol. 41, 2008, pp. 1667-1674.

Sean Conte et al., "Designing conducting polymer films for electrochemical energy storage technologies," RSC Advances, vol. 3, Issue 6, 2013, pp. 1957-1964 (Abstract).

Chang Su et al., "Polytriphenylamine derivative with high free radical density as the novel organic cathode for lithium ion batteries," Journal of Materials Chemisty A, vol. 2, Issue 47, 2014, pp. 20083-20088 (Abstract).

\* cited by examiner

ELECTRODE FOR AN ELECTROCHEMICAL ELEMENT WITH AN ORGANIC ELECTROLYTE, ELECTROCHEMICAL ELEMENTS COMPRISING THE ELECTRODE AND POLYMERIC MATERIAL AND ITS USE AS ELECTRODE ACTIVE MATERIAL OR AS ELECTRODE BINDER

TECHNICAL FIELD

This disclosure relates to an electrode for an electrochemical element with an organic electrolyte, electrochemical elements comprising the electrode and a polymeric material capable of storing electrical energy and its use as electrode active material in the electrode or as an electrode binder.

BACKGROUND

The term "battery" originally meant a plurality of electrochemical cells connected in series in a housing. However, even single electrochemical cells are nowadays frequently referred to as a battery. During discharge of an electrochemical cell, an energy-supplying chemical reaction made up of two electrically coupled, but spatially separated part reactions takes place. A part reaction which takes place at a relatively low redox potential proceeds at the negative electrode and a part reaction takes place at a relatively high redox potential at the positive electrode. During discharge, electrons are liberated by an oxidation process at the negative electrode, resulting in an electron current flowing via an external load to the positive electrode which takes up a corresponding quantity of electrons. Thus, a reduction process takes place at the positive electrode. At the same time, an ion current corresponding to the electrode reaction flows within the cell. This ion current is ensured by an ionically conductive electrolyte. In secondary cells and batteries, this discharging reaction is reversible, i.e., it is possible to reverse the transformation of chemical energy into electric energy that occurred during discharge. Where the terms "anode" and "cathode" are used in this context, the electrodes are generally named according to their function during discharging. The negative electrode in such cells is thus the anode, and the positive electrode is the cathode.

Each electrode comprises at least one electrode active material and electrochemically inactive components. An electrode active material experiences a chemical transformation during charging and discharging, in particular an oxidation or reduction (the above-mentioned oxidation and reduction processes). In contrast, electrochemically inactive components are essentially unaffected during charging and discharging. Examples of electrochemically inactive components of an electrode are electrode binders, current collectors, power outlet leads and conductivity-improving additives. Electrons are supplied to or conducted away from the electrodes by power outlet leads. Electrode binders ensure the mechanical stability of the electrodes and contacting of the particles of electrochemically active material with one another and with the power outlet lead. Conductivity-improving additives contribute to an improved electric connection between the electrochemically active particles and the power outlet lead.

Lithium-ion batteries are the most frequently used secondary batteries for portable electronic devices. The mechanism for charge storage is based on the intercalation/deintercalation of Li-ions in usually metal oxides (electrode active material on the cathode side) and carbon (electrode active material on the anode side). Lithium-ion batteries exhibit good energy density and cycle stability, but moderate capacities or capacity retention at higher current densities because of the slow rates of the electrode reactions, resulting in low power densities.

In contrast, supercapacitors (formerly electric double-layer capacitors) can provide high pulsed currents at high power densities. However, the capacity of double-layer capacitors is limited according to the nature of a capacitor. Furthermore, like all capacitors, supercapacitors have a falling voltage characteristic.

Battery cells utilizing organic compounds as electrode active materials are capable of showing higher power densities and also higher gravimetric energy densities than lithium-ion batteries. One example is the utilization of reversible oxidation/reduction-reactions of compounds containing stable radicals such as nitroxide radicals. For example, EP 2 025 689 A1 discloses the use of nitroxide radical containing polymers as electrode active materials in secondary batteries which show very good capacity retention at higher current rates (high power density) and cyclic stability.

However, many organic electrode materials such as, for example, conducting polymers or also some polyradicals start to degrade when cycled to and held at higher potentials, for example, at potentials close to or above 4 V vs. Li/Li+.

Compounds containing N,N,N',N'-tetrasubstituted-1,4-phenylenediamine units are utilized in optoelectronic devices such as organic light emitting devices (OLED) or electrochromic devices. The use as electrochromic material has been described, for example, in Liou, G.; Chang, C. Macromolecules 2008, 41, 1667-1674. The preparation of polyamides containing N,N,N',N'-tetraphenyl-1,4-phenylenediamine units is described. As another example, U.S. Pat. No. 8,304,514 A discloses a polyfluorene compound containing N,N,N',N'-tetraphenyl-p-phenylenediamine units and its utilization as electrochromic material.

The use of poly(3,4-ethylenedioxythiophene) containing N,N,N',N'-tetraalkylated-1,4-phenylenediamine units as electrical energy storage material has been described in Conte, S.; Rodriguez-Calero, G. G.; Burkhardt, S. E.; Lowe, M. A.; Abruna, H. D. RSC Advances 2013, 3, 1957-1964. The use of a polymer containing N,N,N',N'-tetraphenyl-1, 4-phenylenediamine units as cathode material for lithium ion batteries has been described in Chang Su; Fang Yang; LvLv Ji; Lihuan Xu; Cheng Zhang, J. Mater. Chem. A 2014, 2, 20083-20088.

It has been a major goal to manufacture Li-ion batteries with metal oxide electrodes having good capacity retention at high current densities or high power densities. On the other hand electric double layer capacitors show high power densities, but low energy densities.

SUMMARY

We provide an electrode for an electrochemical element with an organic electrolyte, including a polymeric material containing or composed of subunits according to general formulae (I) and/or (II):

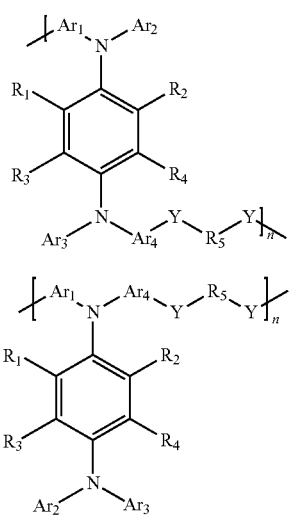

(I)

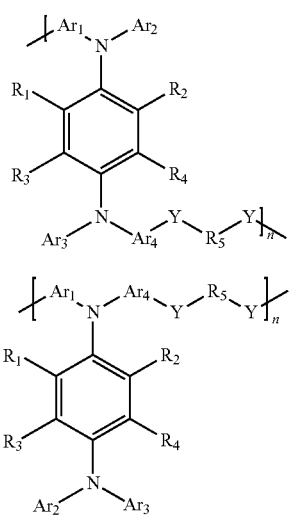

(II)

wherein
n is an integer ≥2,
Y represents an amide group (—NH—CO— or —CO—NH—), an ester group (—O—CO— or —CO—O—) or a urethane group (—NH—CO—O— or —O—CO—NH—),
$R_1$, $R_2$, $R_3$ and $R_4$ each independently represent H, alkyl (preferably —CH$_3$, —C$_2$H$_5$), Alkoxy-(preferably —OCH$_3$, —OC$_2$H$_5$), -halogen or —CN,
$Ar_1$ and $Ar_4$ independently represent a bridging aryl group,
$Ar_2$ and $Ar_3$ independently represent a non-bridging aryl group, and
$R_5$ is a bridging alkyl, alkene or aryl group,
wherein $Ar_1$ and $Ar_4$ in structures (I) and (II) independently represent a bridging aryl group of formula (IIIa), (IIIb) or (IIIc):

(IIIa)

(IIIb)

(IIIc)

wherein
* marks a point of attachment, and
$R_6$, $R_7$, $R_8$ and $R_9$ each independently represent H, alkyl (preferably —CH$_3$, —C$_2$H$_5$), Alkoxy-(preferably —OCH$_3$, —OC$_2$H$_5$), -halogen or —CN and wherein $R_5$ represents one of groups of formulae (IVa) to (IVn)

$$*\!\!-\!\!(CH_2)_m\!\!-\!\!*,$$ (IVa)

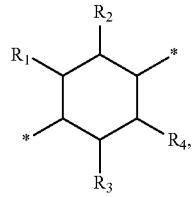

(IVb)

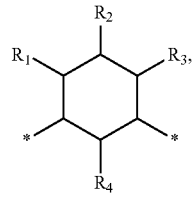

(IVc)

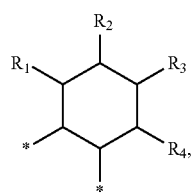

(IVd)

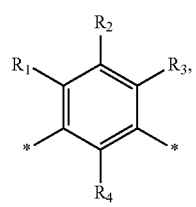

(IVe)

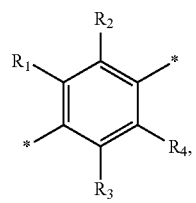

(IVf)

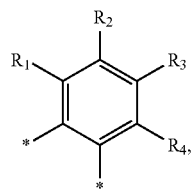

(IVg)

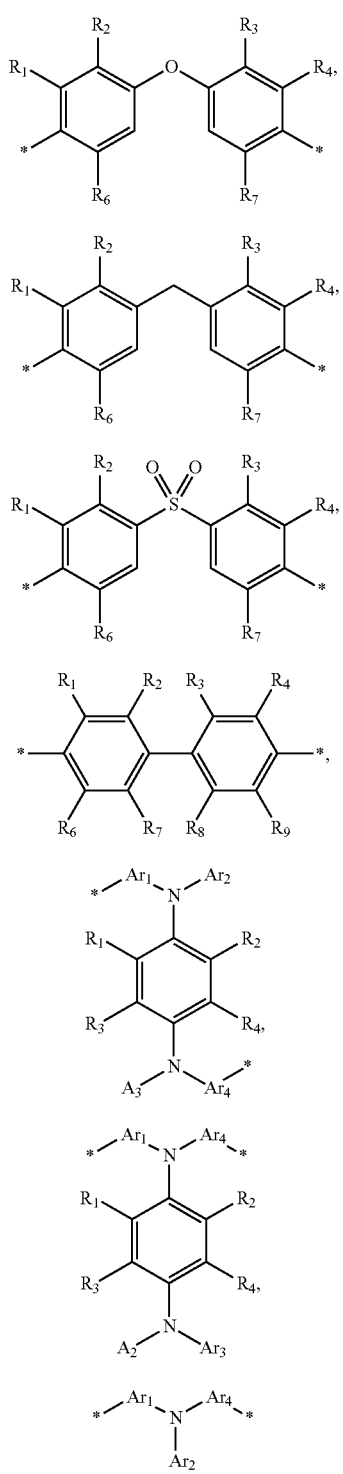

wherein
* marks a point of attachment,
m=1 to 20, and
$R_1, R_2, R_3, R_4, R_6, R_7, R_8, R_9, Ar_1, Ar_2, Ar_3$ and $Ar_4$ have the same meaning as before.

We also provide a secondary lithium-ion battery including the electrode for an electrochemical element with an organic electrolyte, including a polymeric material containing or composed of subunits according to general formulae (I) and/or (II):

$$\left[ \begin{array}{c} Ar_1 \\ | \\ N \\ | \\ Ar_2 \end{array} \right] \text{(I)}$$

$$\left[ \begin{array}{c} Ar_1 \\ | \\ N \\ | \\ Ar_4 \end{array} - Y - R_5 - Y \right]_n \text{(II)}$$

wherein
n is an integer ≥2,
Y represents an amide group (—NH—CO— or —CO—NH—), an ester group (—O—CO— or —CO—O—) or a urethane group (—NH—CO—O— or —O—CO—NH—),
$R_1$, $R_2$, $R_3$ and $R_4$ each independently represent H, alkyl (preferably —CH$_3$, —C$_2$H$_5$),
Alkoxy-(preferably —OCH$_3$, —OC$_2$H$_5$), -halogen or —CN,
$Ar_1$ and $Ar_4$ independently represent a bridging aryl group,
$Ar_2$ and $Ar_3$ independently represent a non-bridging aryl group, and
$R_5$ is a bridging alkyl, alkene or aryl group,
wherein $Ar_1$ and $Ar_4$ in structures (I) and (II) independently represent a bridging aryl group of formula (IIIa), (IIIb) or (IIIc):

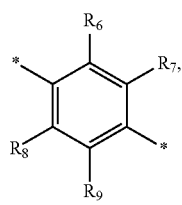

(IIIa)

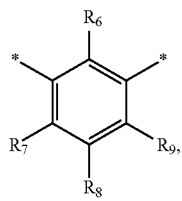

(IIIb)

-continued
(IIIc)
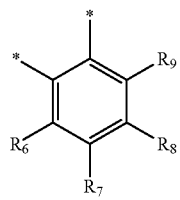
wherein
*marks a point of attachment, and
$R_6$, $R_7$, $R_8$ and $R_9$ each independently represent H, alkyl (preferably —$CH_3$, —$C_2H_5$),
Alkoxy-(preferably —$OCH_3$, —$OC_2H_5$), -halogen or —CN
and wherein $R_5$ represents one of groups of formulae (IVa) to (IVn)
(IVa)
$$*{-}(CH_2)_{\overline{m}}{-}*,$$
(IVb)
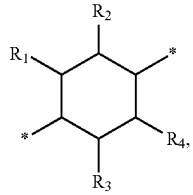
(IVc)
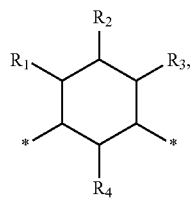
(IVd)
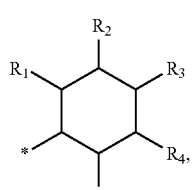
(IVe)
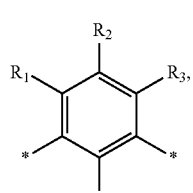
(IVf)
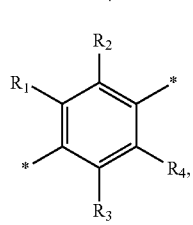
-continued
(IVg)
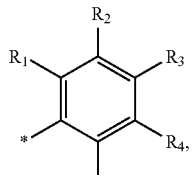
(IVh)
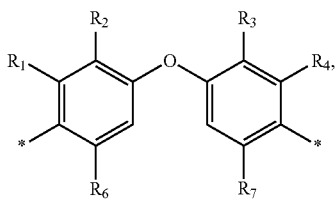
(IVi)
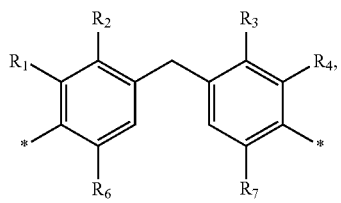
(IVj)
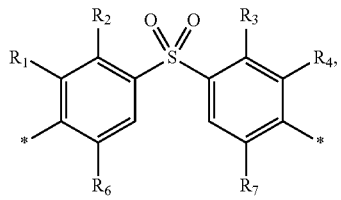
(IVk)
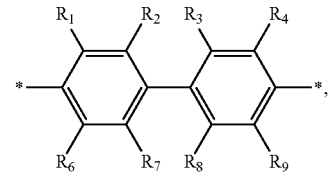
(IVl)
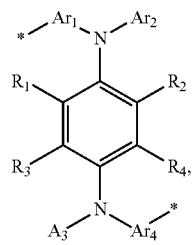
(IVm)
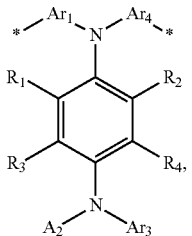
(IVn)
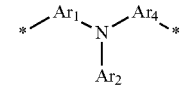

wherein
* marks a point of attachment,
m=1 to 20, and
$R_1, R_2, R_3, R_4, R_6, R_7, R_8, R_9, Ar_1, Ar_2, Ar_3$ and $Ar_4$ have the same meaning as before or a polymeric material containing or being composed of subunits according to general formulae (I) and (II).

We further provide a supercapacitor including the electrode for an electrochemical element with an organic electrolyte, including a polymeric material containing or composed of subunits according to general formulae (I) and/or (II):

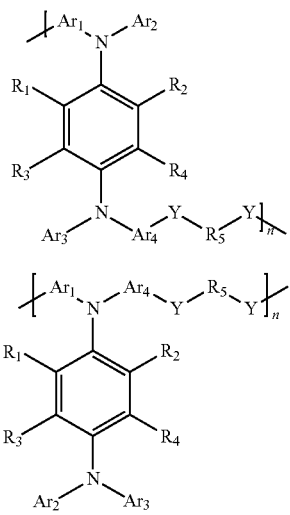

(I)

(II)

wherein
n is an integer≥2,
Y represents an amide group (—NH—CO— or —CO—NH—), an ester group (—O—CO— or —CO—O—) or a urethane group (—NH—CO—O— or —O—CO—NH—),
$R_1, R_2, R_3$ and $R_4$ each independently represent H, alkyl (preferably —CH$_3$, —C$_2$H$_5$),
Alkoxy-(preferably —OCH$_3$, —OC$_2$H$_5$), -halogen or —CN,
$Ar_1$ and $Ar_4$ independently represent a bridging aryl group,
$Ar_2$ and $Ar_3$ independently represent a non-bridging aryl group, and
$R_5$ is a bridging alkyl, alkene or aryl group,
wherein $Ar_1$ and $Ar_4$ in structures (I) and (II) independently represent a bridging aryl group of formula (IIIa), (IIIb) or (IIIc):

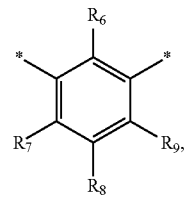

(IIIa)

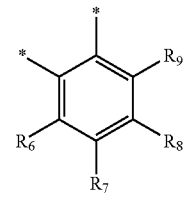

(IIIb)

(IIIc)

wherein
* marks a point of attachment, and
$R_6, R_7, R_8$ and $R_9$ each independently represent H, alkyl (preferably —CH$_3$, —C$_2$H$_5$),
Alkoxy-(preferably —OCH$_3$, —OC$_2$H$_5$), -halogen or —CN and wherein $R_5$ represents one of groups of formulae (IVa) to (IVn)

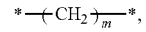

(IVa)

$*{-}(CH_2)_m{-}*,$

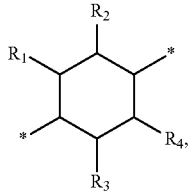

(IVb)

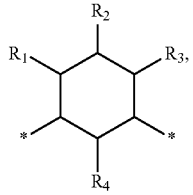

(IVc)

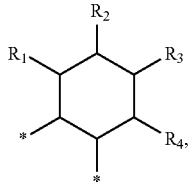

(IVd)

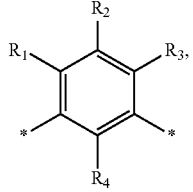

(IVe)

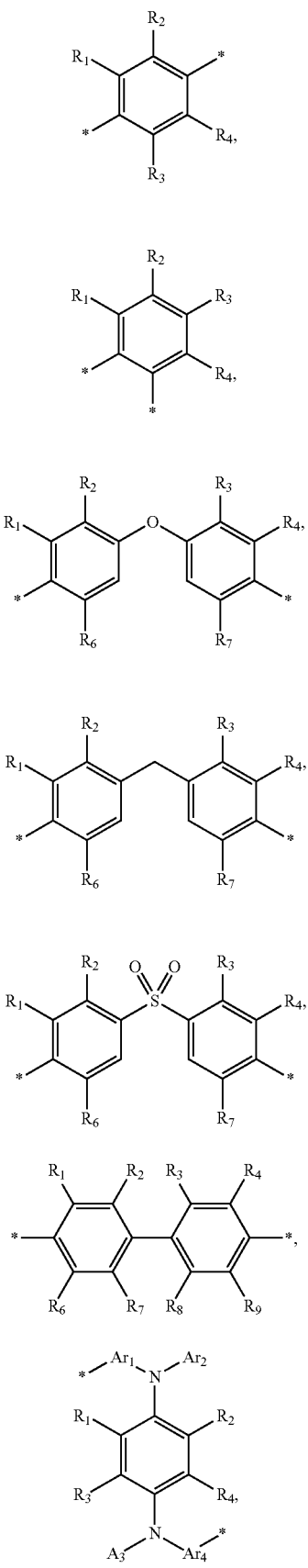

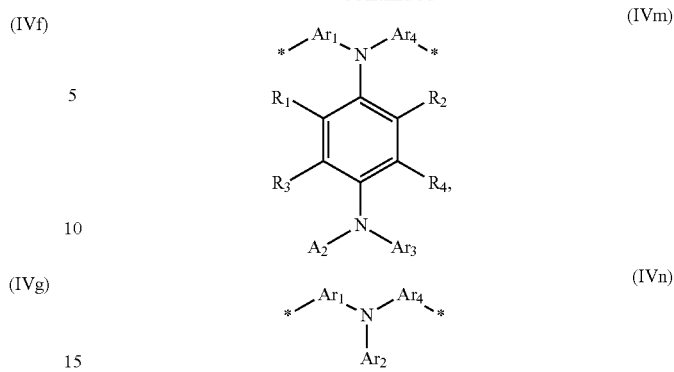

wherein
* marks a point of attachment,
m=1 to 20, and
$R_1, R_2, R_3, R_4, R_6, R_7, R_8, R_9, Ar_1, Ar_2, Ar_3$ and $Ar_4$ have the same meaning as before or a polymeric material containing or being composed of subunits according to general formulae (I) and (II).

DETAILED DESCRIPTION

Figure 1:
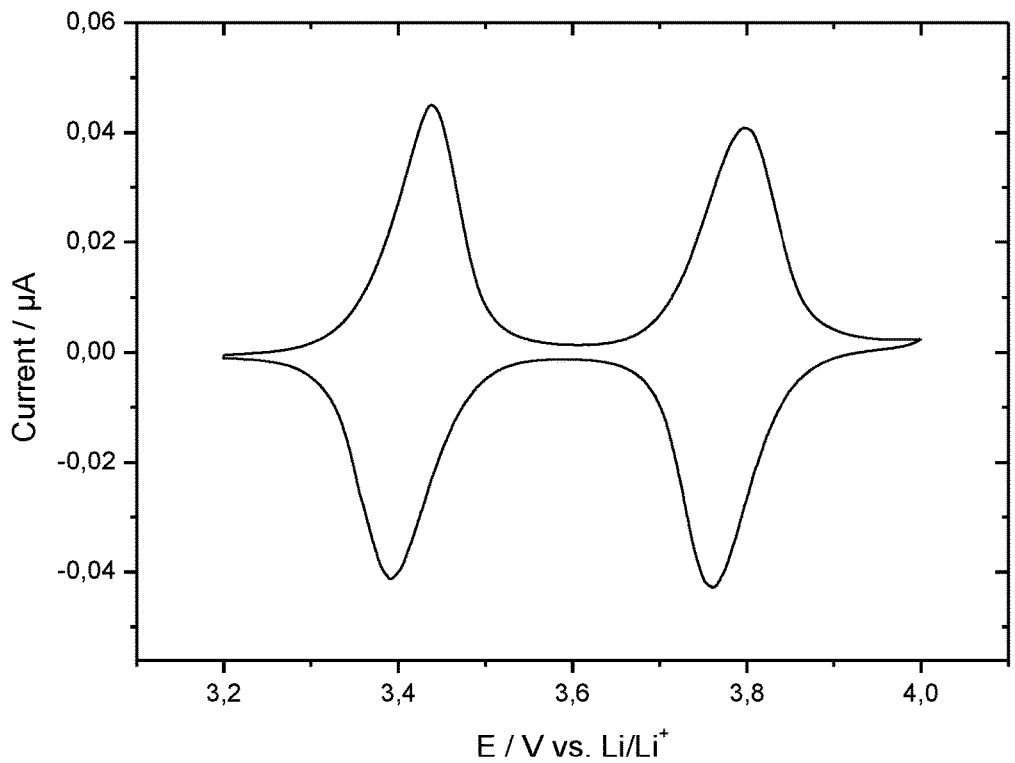
FIG. 1 shows the cyclic voltammogram of a composite electrode of electrode example 1 (scan rate: 0.1 mV/s).
Figure 2:
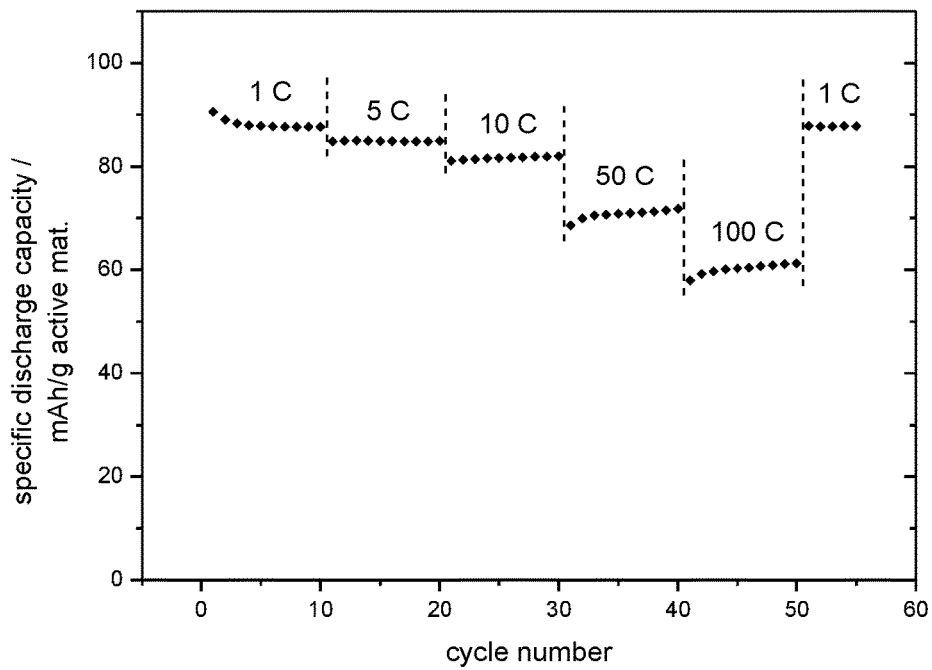
FIG. 2 shows a rate capability test of a composite electrode of electrode example 1.
Figure 3:
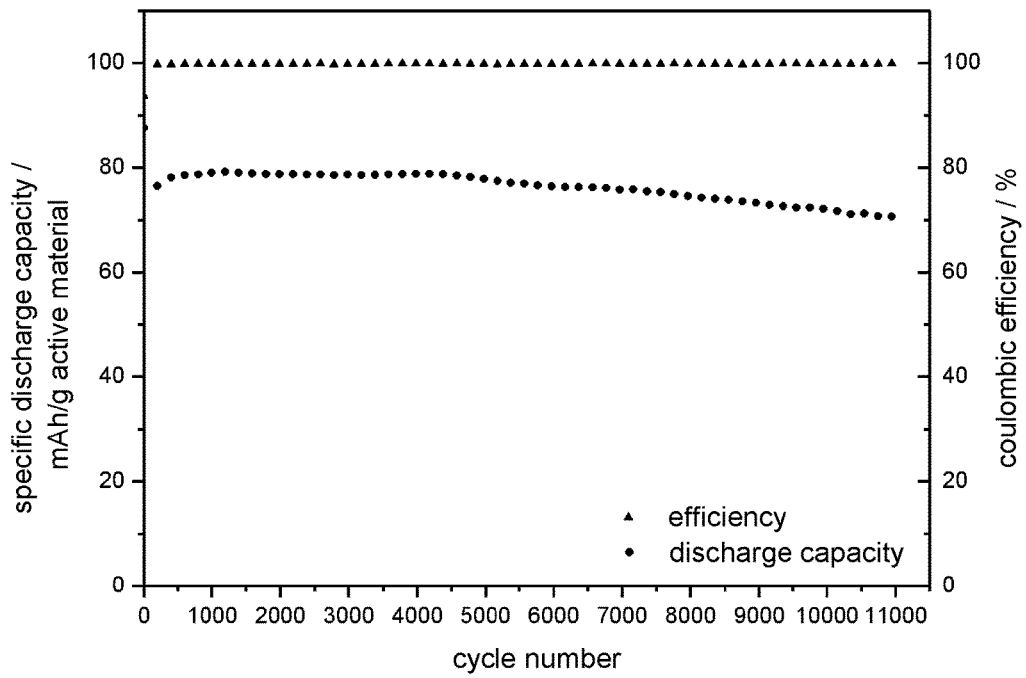
FIG. 3 shows constant current charging/discharging at 10 C of a composite electrode of electrode example 1.
Figure 4:
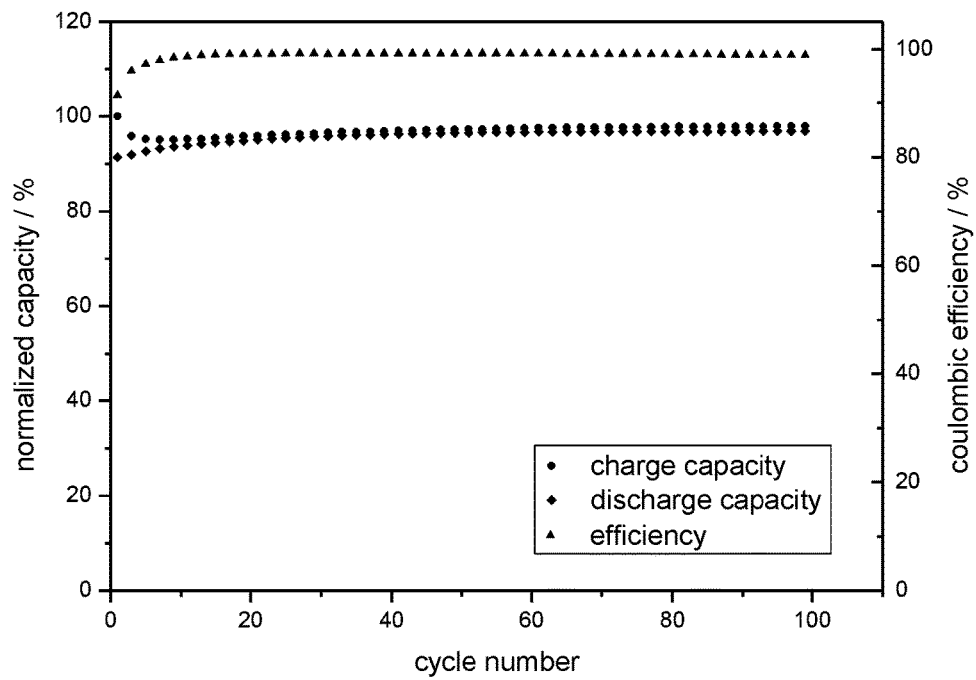
FIG. 4 shows an IU-charging test of a composite electrode of electrode example 1, wherein the half-cell is charged with a constant current of 1 C until the cut-off voltage of 4 V (vs. Li/Li*) is reached. The half-cell is held at 4 V (vs. Li/Li*) for 2 h and then discharged with a constant current of 1 C.

We provide polymers containing N,N,N',N'-tetraphenyl-1,4-phenylenediamine subunits represented by general formulae (I) and/or (II) as electrode active materials in Li-ion batteries. Electrode materials based on these polymers, and utilized, e.g., in secondary Li-ion batteries show high gravimetric energy densities and also high power densities.

An electrode is thus provided that is suitable as electrode for electrochemical elements with organic electrolytes, in particular for batteries and supercapacitors with organic electrolytes. Preferably, the electrode is a positive electrode, for example, a positive electrode of a lithium-ion battery or a positive electrode of a supercapacitor. The electrode comprises, preferably as electrode active material, a polymeric material that contains or is composed of subunits according to general formulae (I) and/or (II):

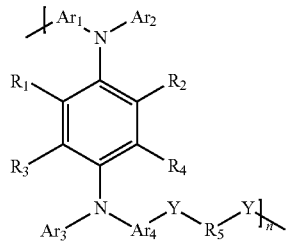
(I)

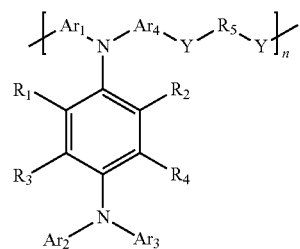
(II)

wherein, in these structures (I) and (II), n is an integer $\geq 2$, preferably $\geq 20$, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl (preferably —CH$_3$, —C$_2$H$_5$), Alkoxy-(preferably —OCH$_3$, —OC$_2$H$_5$), -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group.

Of particular importance are the bridging groups $Ar_1$, $Ar_4$ and $R_5$. $Ar_1$ and $Ar_4$ in structures (I) and (II) independently represent a bridging aryl group of formula (IIIa), (IIIb) or (IIIc):

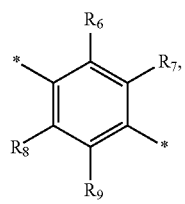
(IIIa)

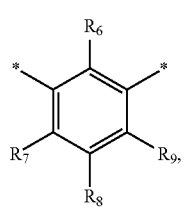
(IIIb)

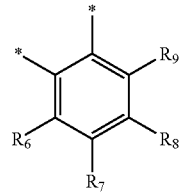
(IIIc)

wherein, in these structures (IIIa) to (IIIc),

* marks a point of attachment $R_6$, $R_7$, $R_8$ and $R_9$ each independently represent H, alkyl (preferably —CH$_3$, —C$_2$H$_5$), Alkoxy-(preferably —OCH$_3$, —OC$_2$H$_5$), -halogen or —CN.

$R_5$ represents one of the groups of formulae (IVa) to (IVq):

(IVa)

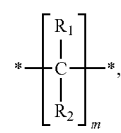
(IVb)

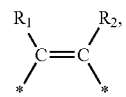
(IVc)

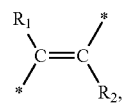
(IVd)

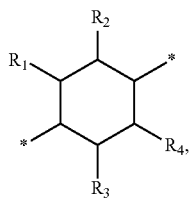
(IVe)

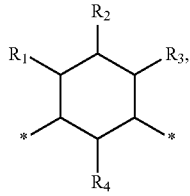
(IVf)

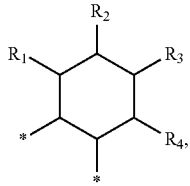
(IVg)

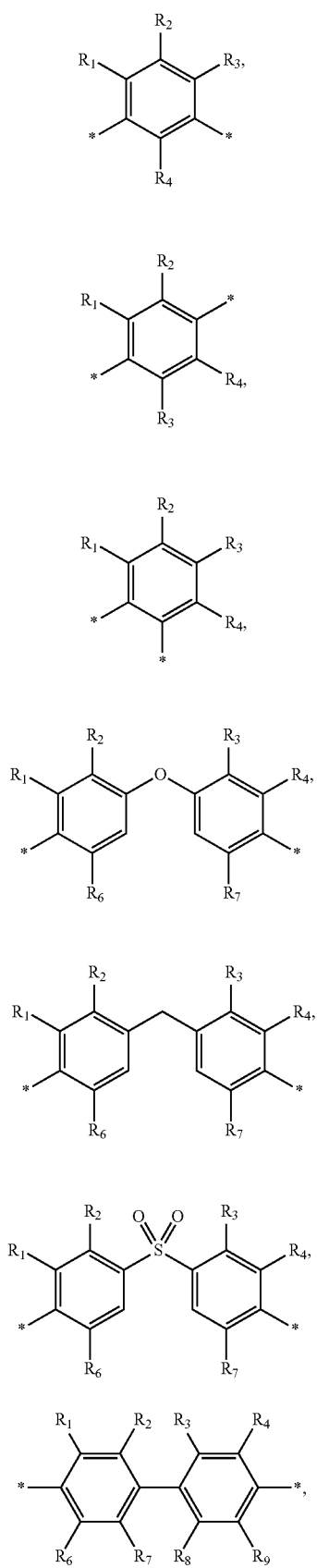

(IVh)
(IVi)
(IVj)
(IVk)
(IVl)
(IVm)
(IVn)

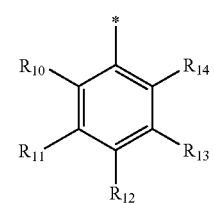

(IVo)
(IVp)
(IVq)

wherein
* marks a point of attachment,
m=1 to 20, and
$R_1, R_2, R_3, R_4, R_6, R_7, R_8, R_9, Ar_1, Ar_2, Ar_3$ and $Ar_4$ have the same meaning as before.

Thus, the polymeric material is either a polyamide or a polyester or a polyurethane. Cycle stabilities of Li-ion batteries containing the described polyamide or polyester or polyurethane as electrode active material are comparable to capacitors and excellent electrochemical stability when cycled to and held at high potentials is also given.

Preferably, $Ar_2$ and $Ar_3$ in structures (I) and (II) independently represent a non-bridging aryl group of formula (V):

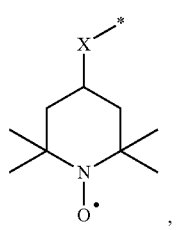

(V)

wherein
$R_{10}, R_{11}, R_{12}, R_{13}$ and $R_{14}$ each independently represent H, alkyl (preferably —$CH_3$, —$C_2H_5$), Alkoxy-(preferably —$OCH_3$, —$OC_2H_5$), halogen, CN or one of the groups of formulae (VIa) and (VIb)

(VIa)

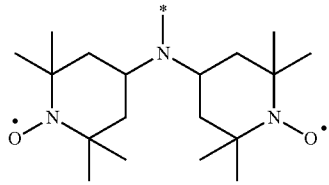

(VIb)

wherein

* marks a point of attachment and

X represents O or NH.

In electrochemical elements with an organic electrolyte containing polymers represented by general formulae (I) and (II) as electrode active material, the mechanism of energy storage is the reversible oxidation/reduction of the N,N,N',N'-tetraphenyl-1,4-phenylenediamine unit according to scheme 1:

Scheme 1

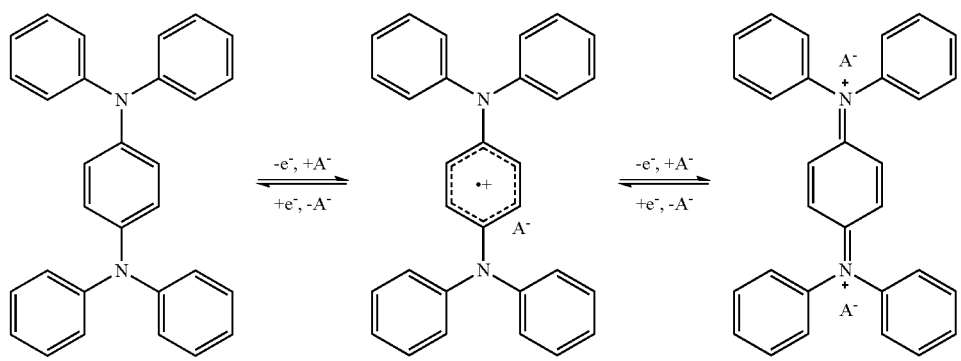

In this scheme, A⁻ is the anion derived from the electrolyte salt and may be, for example, the anion derived from LiPF$_6$, LiClO$_4$, LiBF$_4$, LiN(SO$_2$CF$_3$) or NaCl.

The polymer compound may also carry stable nitroxide radicals. The underlying mechanism of energy storage is the reversible oxidation/reduction of the nitroxide radical according to scheme 2 representatively showing the redox couples of 2,2,6,6-tetramethylpiperidine-1-oxyl (TEMPO):

Scheme 2

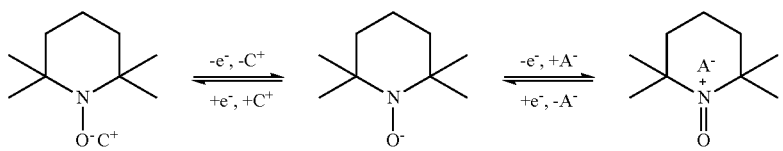

In this scheme, A⁻ has the same meaning as before and C⁺ is the cation derived from the electrolyte salt and may be, for example, Li⁺ or Na⁺.

Polymer Examples

Non-limiting examples of individual compounds having a structure represented by general formulae (I) and (II), are represented by the following formulae 1-16. The theoretical specific capacity (Ah/kg) is shown in brackets and has been calculated using equation (1):

$$\text{Theoretical specific capacity} = F/[3.6 \times (M/z)] \quad (1)$$

F=Faraday constant=96485 C/mol
M=molecular weight of the repeating unit
z=electrons transferred per repeating unit

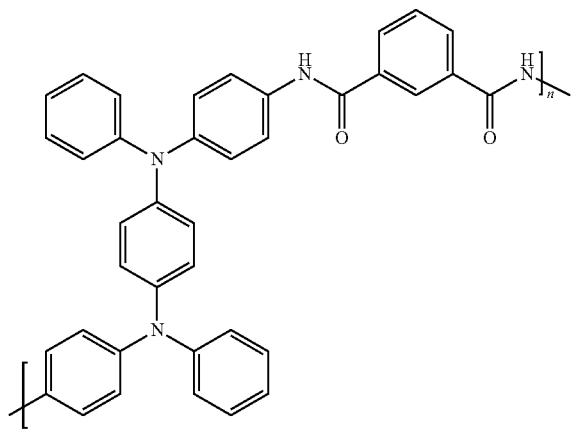
(1)
(93.6 Ah/kg)
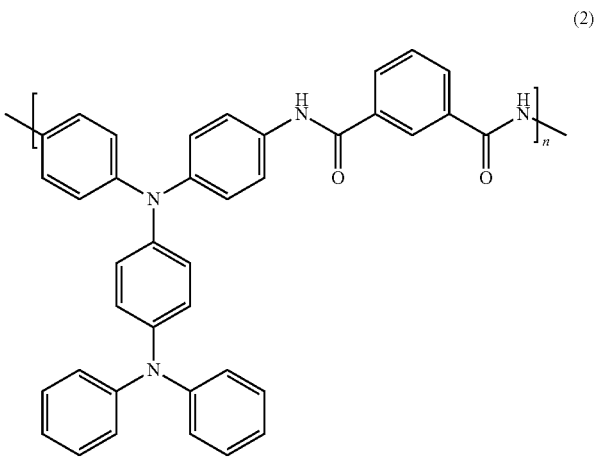
(2)
(93.6 Ah/kg)
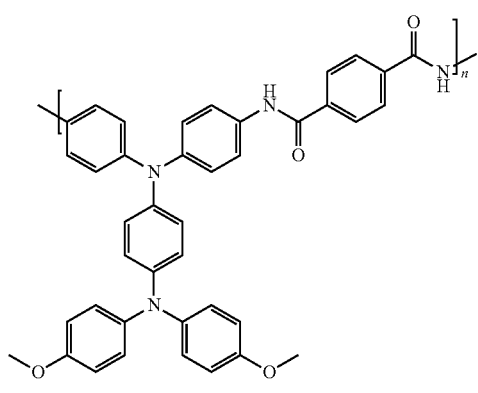
(3)
(84.7 Ah/kg)
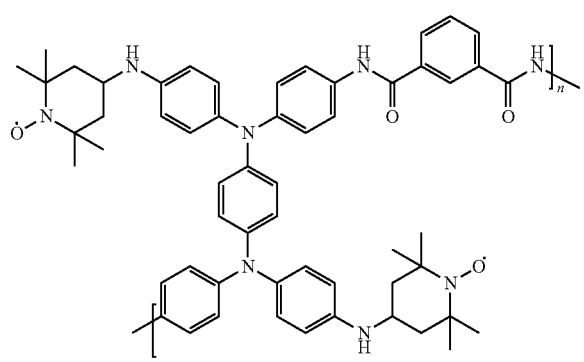
(4)
(117.7 Ah/kg)
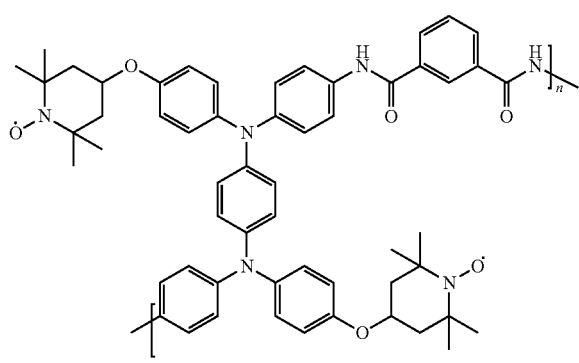
(5)
(117.4 Ah/kg)
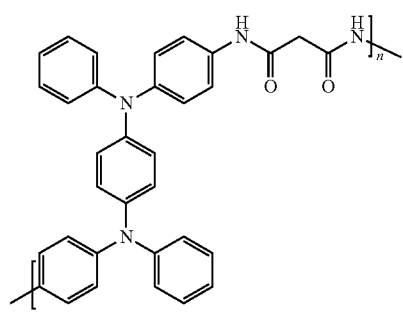
(6)
(105 Ah/kg)

(7)
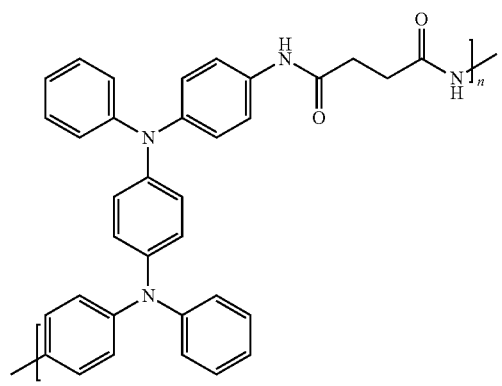
(102.2 Ah/kg)
(8)
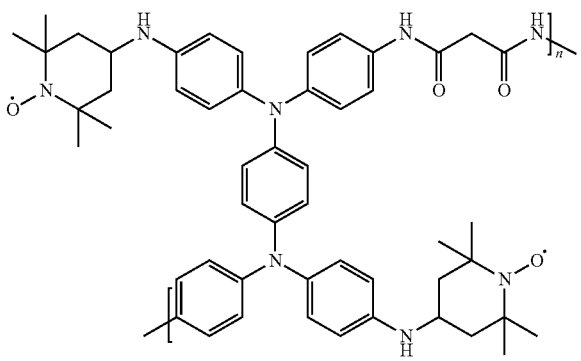
(126.3 Ah/kg)
(9)
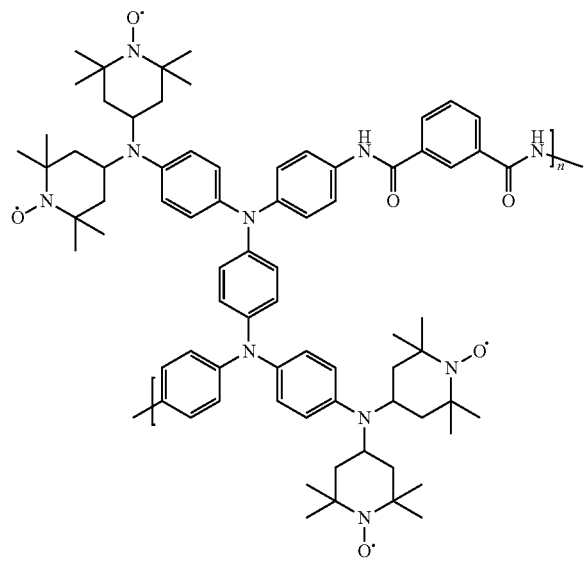
(131.9 Ah/kg)
(10)
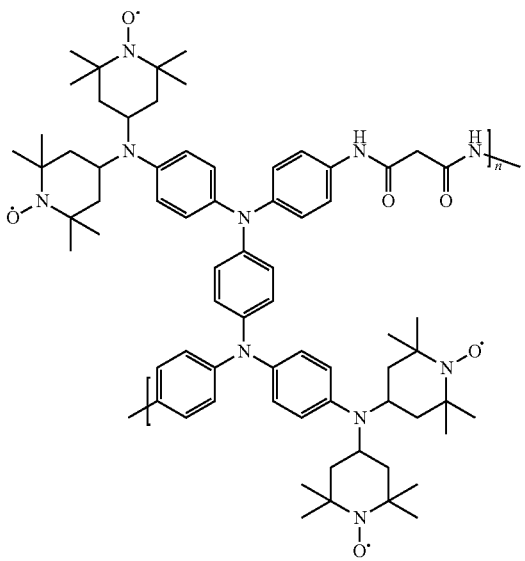
(138.9 Ah/kg)
(11)
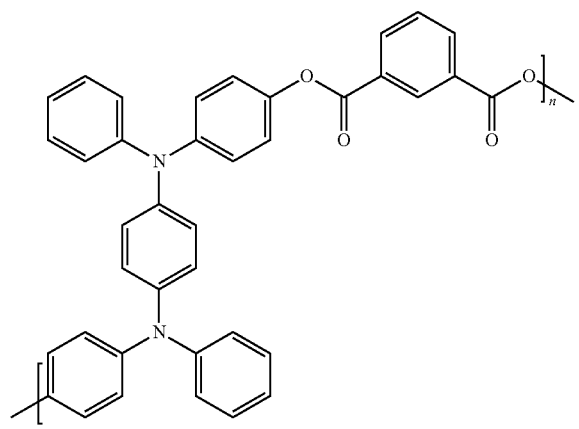
(93.3 Ah/kg)
(12)
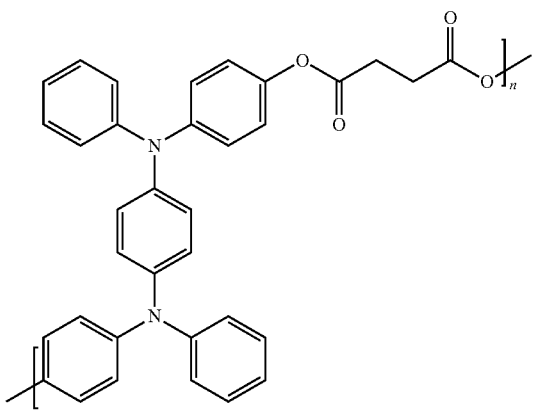
(101.8 Ah/kg)

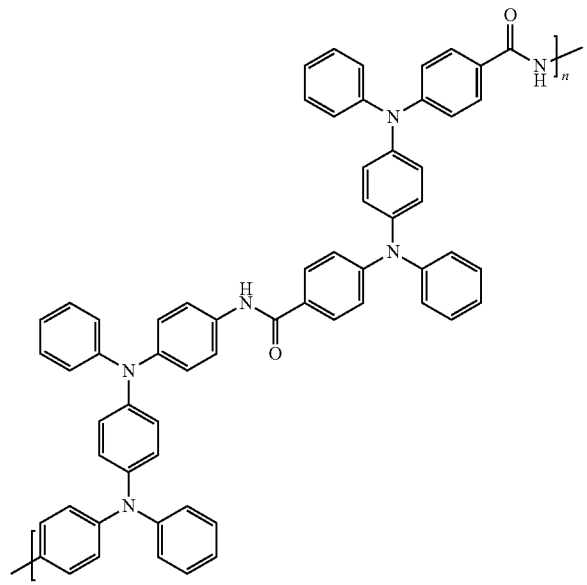
(13)
(118.2 Ah/kg)
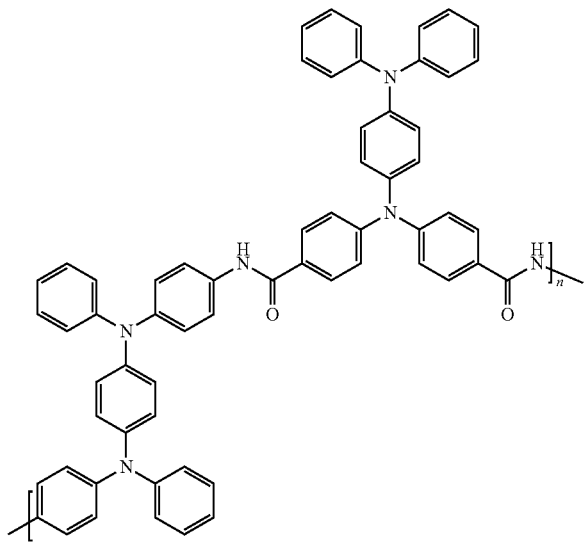
(14)
(118.2 Ah/kg)
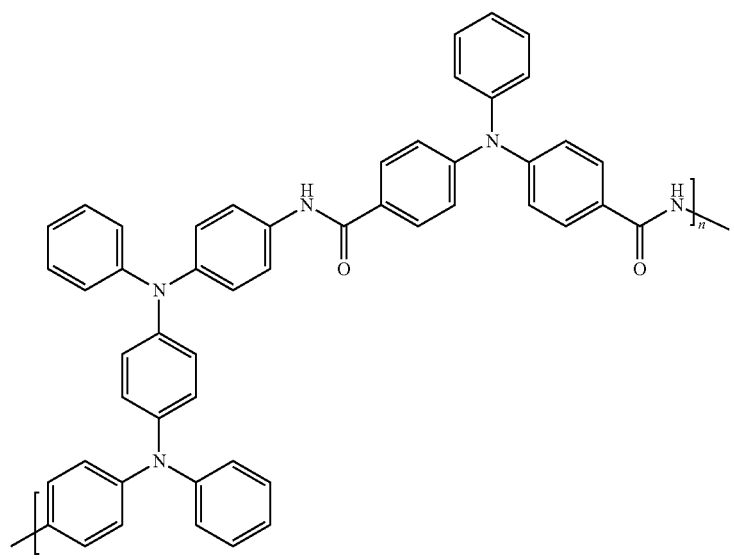
(15)
(108.7 Ah/kg)

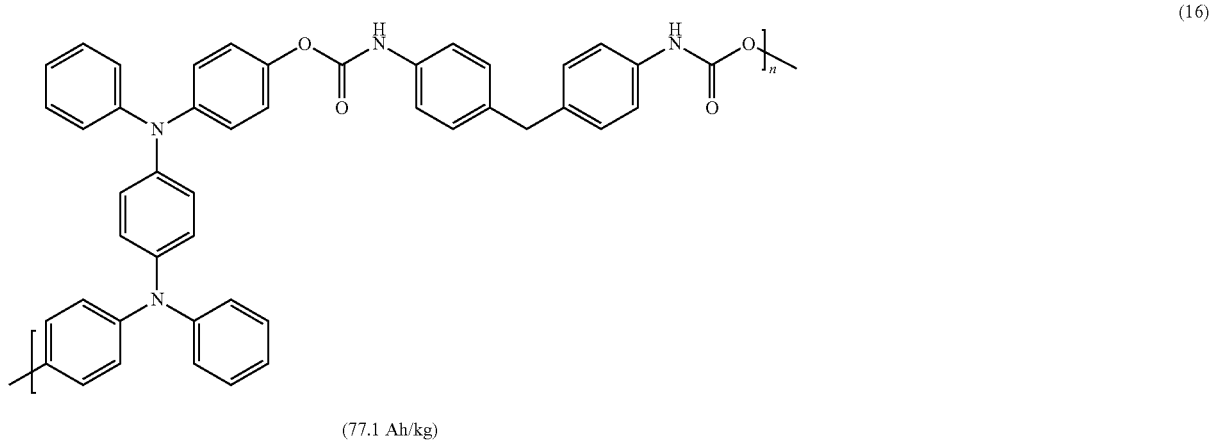

(16)

(77.1 Ah/kg)

The polymeric material preferably has a dynamic viscosity from 2.5 mPas to 50 mPas (measured in NMP at 20° C. and a concentration of 2 wt. %).

Preferably the polymeric material has an average molecular weight of 200.000 g/mol to 400.000 g/mol.

The electrode may comprise a current collector, in particular a current collector made of aluminium or copper.

It is preferred that the electrode comprises, in addition to the polymeric material according to general formulae (I) and (II) or to one of the preferred examples above, at least one carbon material selected from the group consisting of carbon black, graphite, activated carbon, carbon nanotubes and graphene, in particular as conductivity-improving additive.

Preferably, the carbon material is contained in the electrode in an amount of 0.1% by weight to 99.9% by weight, more preferably 25% by weight to 95% by weight, in particular 45% by weight to 75% by weight.

The polymeric electrode material is preferably contained in the electrode in an amount of 0.1% by weight to 99.9% by weight, more preferably 25% by weight to 95% by weight, in particular 45% by weight to 75% by weight.

Further preferably, the electrode comprises at least one electrode binder. All known binders for lithium-ion batteries are suitable as binder for an electrode. However, particularly preferably the binder is selected from the group consisting of a cellulose-based binder, a polyacrylate-based binder and a polyvinylidene-based binder (in particular polyvinylidene fluoride and polyvinylidene difluoride).

The electrode binder is preferably contained in the electrode in an amount of 0.1% by weight to 20% by weight, more preferably 0.1% by weight to 10% by weight, in particular 1% by weight to 10% by weight. Even more preferred is an amount between 1% by weight to 7.5% by weight.

We found that the polymeric material described above itself has binding properties. Thus, it is possible to use the polymeric material as reactive electrode binder. There are preferred examples of the electrode that do not contain any additional electrode binder. These electrodes can consist of the polymeric electrode material and the carbon material.

Each lithium-ion battery comprising an electrode as described above or the polymeric electrode material containing or being composed of subunits according to general formulae (I) and (II) above is part of this disclosure. It is preferred, that the lithium-ion battery is a secondary battery.

Preferably, the claimed lithium-ion battery contains the electrode described above as a positive electrode.

Further preferably, the positive electrode of the lithium-ion battery contains at least one metal oxide as active material, in particular at least one oxide from the group comprising lithium-cobalt oxide ($LiCoO_2$), $LiMn_2O_4$ spinel, lithium-iron phosphate ($LiFePO_4$) and derivatives such as $LiNi_{1/3}Mn_{1/3}Co_{1/3}O_2$ or $LiMnPO_4$, and the polymeric electrode material containing or being composed of subunits according to general formulae (I) and (II) above as electrode binder. In this case, the polymeric material is preferably contained in the electrode in an amount of 0.1% by weight to 20% by weight, more preferably 0.1% by weight to 10% by weight, in particular 1% by weight to 10% by weight.

The negative electrode of the battery may contain metallic lithium or particles based on carbon like graphitic carbon or nongraphitic carbon materials capable of intercalation of lithium. Furthermore, the negative electrode may also contain metallic and semimetallic materials which can be alloyed with lithium. Thus, for example, the elements tin, antimony and silicon are able to form intermetallic phases with lithium.

Further, each supercapacitor that comprises an electrode as described above or the polymeric electrode material containing or being composed of subunits according to general formulae (I) and (II) above is part of this disclosure.

It is known that supercapacitors both show a double-layer capacitance and a psudo-capacitance. Double-layer capacitance means that electrostatic storage is achieved by separation of charge in a Helmholtz double layer at the interface between the surface of a conductive electrode and an electrolyte and pseudocapacitance means a faradaic electrochemical storage with electron charge-transfer, achieved by redox reactions, intercalation or electrosorption.

Preferably, our supercapacitor comprises as negative electrode a carbon electrode, in particular an electrode comprising or being composed of activated carbon. Preferably the negative electrode contains the carbon or activated carbon in an amount of 10% by weight to 100% by weight, more preferably 25% by weight to 99% by weight, in particular 50% by weight to 99% by weight. Even more preferred is an amount of 75% by weight to 99% by weight.

The positive electrode of a supercapacitor preferably comprises the polymeric compound described above, preferably in combination with carbon, in particular with activated carbon.

The positive electrode of a supercapacitor preferably comprises the carbon in an amount of 1% by weight to 99% by weight, more preferably 15% by weight to 95% by weight, more preferably 50% by weight to 85% by weight, in particular 60% by weight to 80% by weight.

The polymeric electrode material is preferably contained in the positive electrode of a supercapacitor in an amount of 5% by weight to 75% by weight, more preferably 10% by weight to 50% by weight, in particular 15% by weight to 40% by weight.

If the polymeric compound is present in combination with the carbon, the carbon is preferably contained in the electrode in an amount of 40% by weight to 99% by weight, more preferably 50% by weight to 80% by weight, and the polymeric compound is preferably contained in the electrode in an amount of 1% by weight to 60% by weight, more preferably 20% by weight to 50% by weight.

Preferably, the activated carbon used in the positive and/or in the negative electrode of the supercapacitor or in the electrode has a BET-surface of at least 900 $m^2/g$ (determined according to German standard DIN ISO 9277) and/or a capacity of at least 60 F/g (determined according to German standard DIN IEC 62391).

The positive and the negative electrode of a supercapacitor may contain an electrode binder and/or a conductivity-improving additive, in particular one of the known binders for lithium-ion batteries and/or one of the conductivity-improving additives described above, preferably in an amount of 0.1% by weight to 20% by weight, more preferably 0.1% by weight to 10% by weight, in particular 1% by weight to 10% by weight.

The above mentioned percentages relate in each case to the total weight of the electrodes in a dry condition, that is before the electrodes are impregnated with electrolyte, without taking into account the weight of a current collector, if any. Further, the above mentioned percentages preferably sum up to 100% by weight.

We further provide for the use of a compound according to formulae (I) and (II) or the use of one of the preferred examples described above as electrode active material in the electrode of a battery, in particular in a lithium-ion battery, or in the electrode of a supercapacitor.

Still further, we provide the use of a compound according to formulae (I) and (II) as electrode binder in the electrode of a battery, in particular in a lithium-ion battery.

As organic electrolyte the electrochemical element and the electrode may contain in particular any organic electrolyte known to be suitable as electrolyte for lithium-ion batteries or supercapacitors. Preferably, the electrolyte is a mixture of a solvent and a conducting salt contained therein. The solvent preferably comprises ethylene carbonate (EC) and at least one further carbonate selected from the group consisting of diethyl carbonate (DEC), dimethyl carbonate (DMC), ethyl-methyl carbonate (EMC) and propylene carbonate (PC).

The conducting salt is preferably a lithium fluorophosphate, a lithium borate and/or a lithium alkylsulfonylimid.

Our polymeric material, elements and electrodes are further illustrated by the following figures and examples, however, without being restricted thereto.

EXAMPLES

Example 1

A copolymer of N,N'-bis(4-aminophenyl)-N,N'-diphenyl-1,4-phenylenediamine and isophthaloyl dichloride (compound 1) was synthesized as a first example of a polymeric electrode material according to the following scheme:

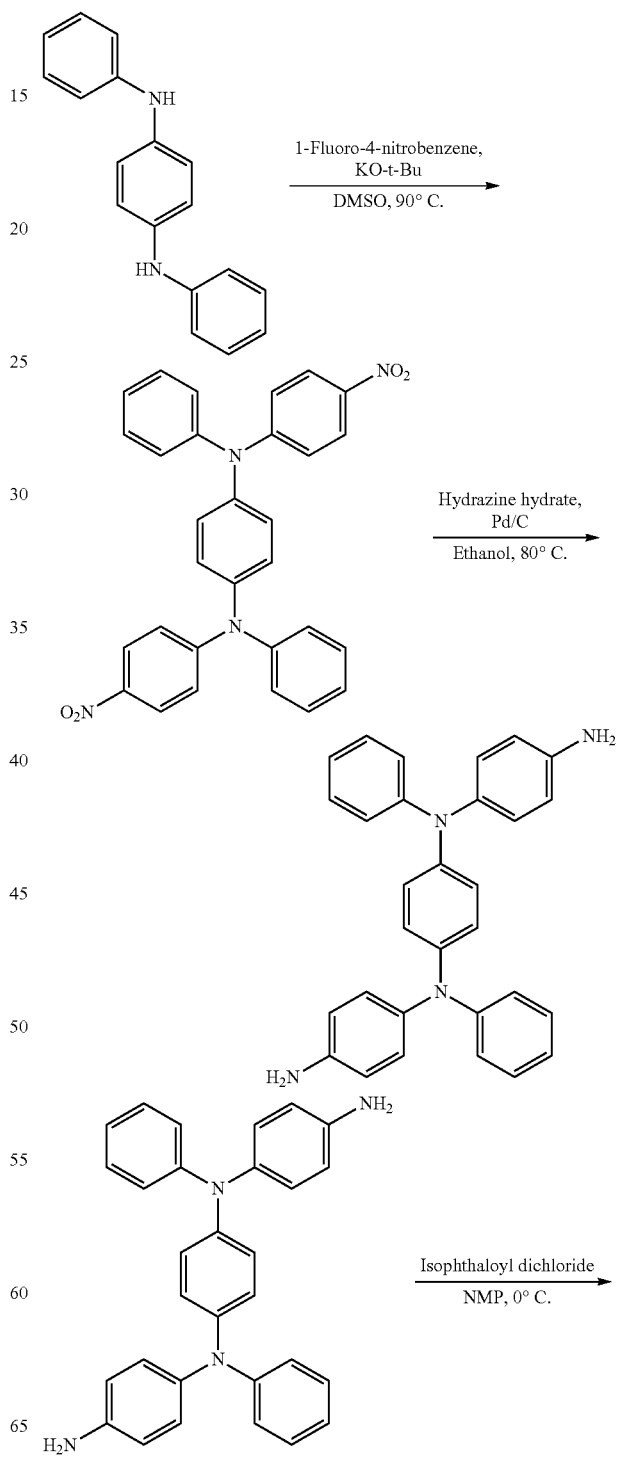

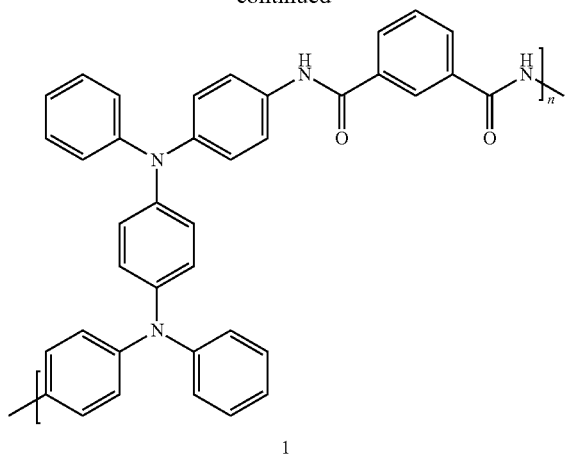

1

Step A: N,N'-bis(4-nitrophenyl)-N,N'-diphenyl-1,4-phenylenediamine

Prepared as described in Davis, M. C.; Chafin, A. C.; Sathrum, A. J. Synthetic Communications 2005, 35, 2085-2090.

Purified N,N'-diphenyl-p-phenylenediamine (2.03 g, 7.8 mmol) was dissolved in anhydrous DMSO (13.4 mL), potassium tert-butoxide (2.20 g, 2.5 eq.) and 1-fluoro-4-nitrobenzene (2.15 mL, 2.6 eq) were added and the reaction mixture stirred for 17 h at 90° C. The mixture was cooled to room temperature and added dropwise to 200 mL of a stirred solution of saturated aqueous NaCl. The resulting orange-brown precipitate was filtered, washed with 100 mL of water and dissolved in 100 mL of dichloromethane. The organic phase was washed 2 times with approximately 50 mL of water, dried over $Na_2SO_4$ and concentrated under reduced pressure. The crude product was dispersed in 100 mL of refluxing acetonitrile for 1 h, cooled, filtered and dried under vacuum to obtain the title compound as orange-red solid (3.57 g, 91%).

$^1$H NMR (300.36 MHz, DMSO-d6, δ in ppm): 8.14-8.04 (m, 4H), 7.54-7.43 (m, 4H), 7.35-7.25 (m, 10H), 6.92-6.83 (m, 4H); $^{13}$C NMR (APT, 75.53 MHz, DMSO-d6, δ in ppm): 153.18, 144.82, 142.38, 139.28, 130.37, 127.93, 127.00, 126.44, 125.65, 117.34; EI-MS: M+, m/z found: 502.1635 Da, calculated for $C_{30}H_{22}N_4O_4$: 502.1641 Da; IR: 1581, 1486, 1310, 1298, 1279, 1255, 1185, 1107, 997, 832, 749, 710, 691, 649, 553, 519, 502, 414 cm$^{-1}$.

Step B: N,N'-bis(4-aminophenyl)-N,N'-diphenyl-1,4-phenylenediamine

Prepared as described in Liou, G.-S.; Hsiao, S.-H.; Ishida, M.; Kakimoto, M.; Imai, Y. Journal of Polymer Science Part A: Polymer Chemistry 2002, 40, 2810-2818. N,N'-bis(4-nitrophenyl)-N,N'-diphenyl-1,4-phenylenediamine (1.52 g, 3 mmol) and Pd/C (80 mg, 5.3 wt-%) were dispersed in ethanol (10 mL), hydrazine hydrate (1.5 mL, 10.2 eq.) was added dropwise and the reaction mixture stirred at 80° C. for 17 h. After cooling, 20 mL of DMF were added, the mixture filtered to remove the catalyst and washed thoroughly with approximately 30 mL of DMF. The filtrate was concentrated under reduced pressure, added dropwise to 100 mL of a stirred solution of saturated aqueous NaCl and the resulting precipitate filtered. The crude product was slurried in 50 mL of boiling toluene for 3 h, cooled and filtered. This purifying procedure was repeated and the resulting solid dried under vacuum to obtain the title compound as beige solid (0.62 g, 46%).

$^1$H NMR (300.36 MHz, DMSO-d6, δ in ppm): 7.20-7.10 (m, 4H), 6.90-7.73 (m, 14H), 6.60-6.52 (m, 4H), 5.05 (s, 4H, —NH2); $^{13}$C NMR (APT, 75.53 MHz, DMSO-d6, δ in ppm): 148.45, 146.11, 142.06, 135.27, 128.95, 127.91, 123.80, 119.95, 119.78, 115.0; EI-MS: M+, m/z found: 442.2146 Da, calculated for $C_{30}H_{26}N_4$: 442.2158 Da; IR: 3469, 3377, 3032, 1620, 1590, 1501, 1482, 1306, 1263, 1175, 1121, 1079, 1026, 834, 754, 723, 697, 665, 586, 534, 518, 507, 442, 409 cm$^{-1}$

Step C: Polymerization

N,N'-bis(4-aminophenyl)-N,N'-diphenyl-1,4-phenylenediamine (306 mg, 0.69 mmol) was dissolved in anhydrous NMP (1.85 mL), cooled to 0° C. and isophthaloyl dichloride (140 mg, 1 eq., recrystallized from n-hexane prior to use) was added in portions. The reaction mixture was gradually warmed up to room temperature with stirring. After 3 h the now highly viscous solution was added dropwise to 20 mL of stirred methanol. The precipitate was stirred in 20 mL of boiling methanol for 3 hours, filtered and dried under vacuum to obtain compound 1 as green solid (389 mg, 98%).

$^1$H NMR (300.36 MHz, DMSO-d6, δ in ppm): 10.35 (s, 2H, —NH—CO—), 8.44 (s, 1H), 8.12-7.98 (m, 2H), 7.75-7.55 (m, 5H), 7.20 (br, 4H), 7.05-6.81 (m, 14H); $^{13}$C NMR (APT, 75.53 MHz, DMSO-d6, δ in ppm): 164.78, 147.47, 142.97, 142.24, 135.19, 134.47, 129.40, 124.84, 124.49, 122.52, 121.72; IR: 3273, 3035, 1665, 1593, 1498, 1308, 1263, 1111, 827, 753, 718, 695, 522, 470, 411 cm$^{-1}$

Example 2

A copolymer of N,N-Bis(4-aminophenyl)-N',N'-di(4-methoxyphenyl)-1,4-phenylenediamine and terephthalic acid (compound 3) was synthesized as a second example of a polymeric electrode material according to the following scheme:

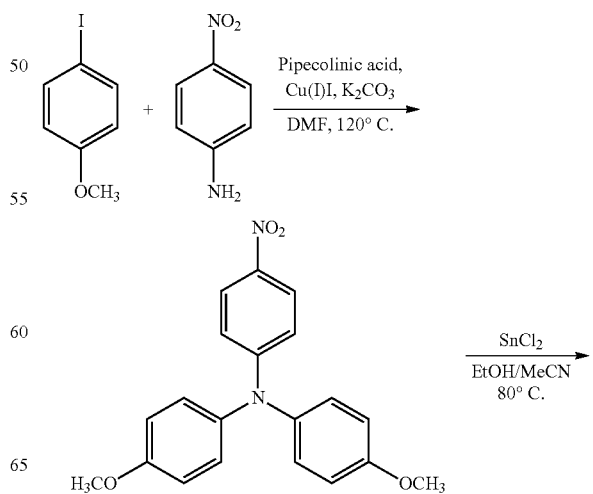

-continued

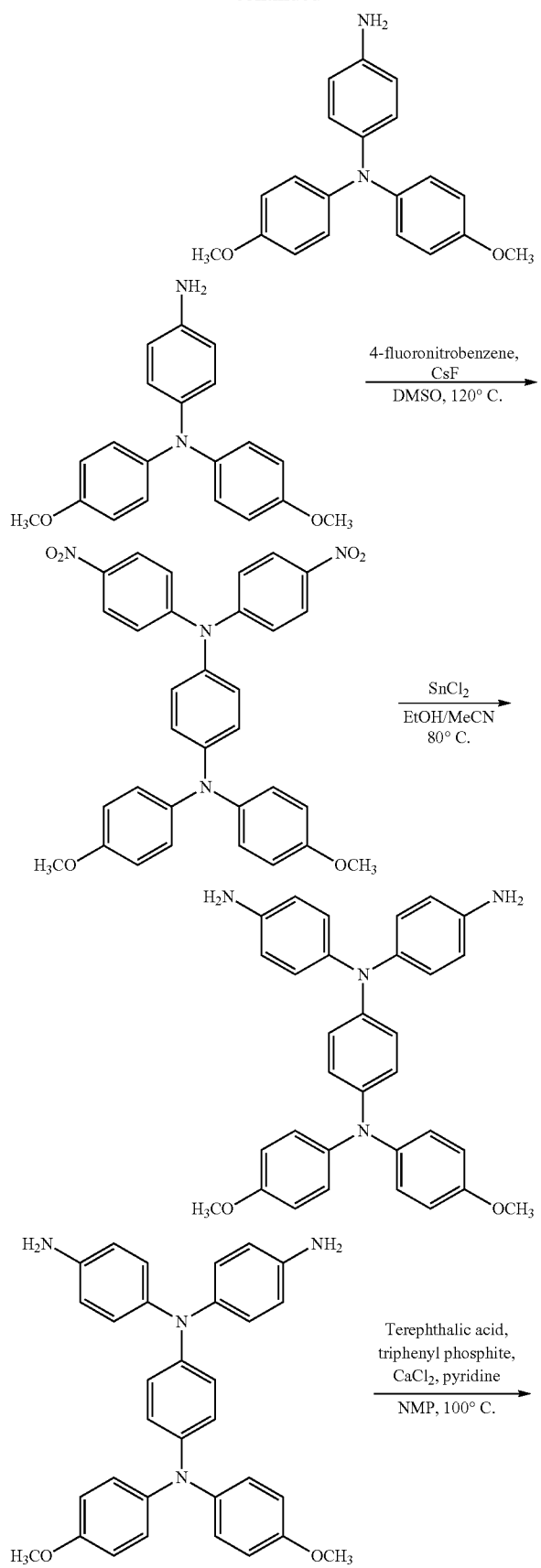

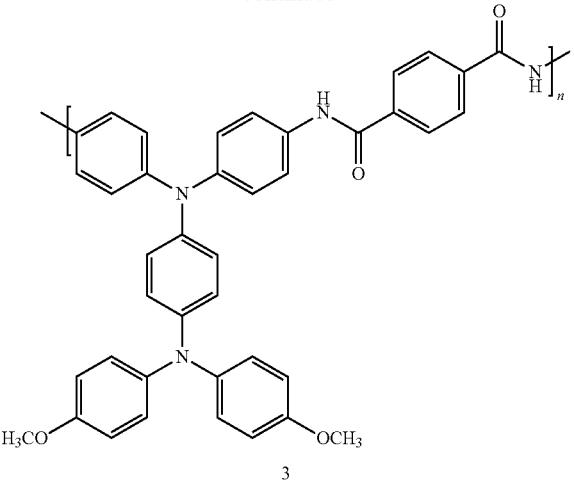

Step A: 4-Nitro-4',4"-dimethoxytriphenylamine

Iodoanisole (2 g, 8.54 mmol, 4 eq) and nitroaniline (295 mg, 2.14 mmol, 1 eq) were dissolved in 8 mL DMF and added dropwise to pipecolinic acid (221 mg, 1.71 mmol, 0.8 eq), copper(I)iodide (163 mg, 0.86 mmol, 0.4 eq) and potassium carbonate (2.4 g, 0.22 mol, 8 eq). The reaction mixture was stirred for 48 h at 120° C. After cooling, the mixture was extracted with ethylacetate and NaOH. The organic phase was dried over Na2SO4 and concentrated under reduced pressure. After column chromatography on silica (eluent: cyclohexane/ethyl acetate=1:1) the title compound was obtained (487 mg, 65%).

$^1$H-NMR (300 MHz, CDCl$_3$, δ): 8.00 (d, 2H) 7.13 (d, 4H), 6.91 (d, 4H), 6.75 (d, 2H), 3.82 (s, 6H, OCH$_3$); $^{13}$C-NMR (75 MHz, CDCl$_3$, δ): 157.7, 154.1, 139.0, 138.3, 128.1, 125.6, 115.7, 115.2, 55.5.

Step B: 4-Amino-4',4"-dimethoxytriphenylamine

4-Nitro-4',4"-dimethoxytriphenylamine (0.3 g, 0.86 mmol, 1 eq) was dissolved in 14 mL acetonitrile and 12 mL ethanol. Tin(II)chloride (1.8 g, 9.64 mmol, 11 eq) was added and the mixture stirred at 80° C. over night. After cooling, ethylacetate was added and the mixture washed with NaHCO3 and brine. The resulting emulsion was extracted 10 times with ethyl acetate. The organic phase was dried over Na2SO4 and concentrated under reduced pressure (240 mg, 88%).

$^1$H-NMR (300 MHz, CDCl$_3$, δ): 6.81 (d, 4H), 6.77 (d, 4H), 6.72 (d, 2H), 6.53 (d, 2H), 4.90 (s, 2H, NH2), 3.67 (s, 6H, OCH$_3$); $^{13}$C-NMR (75 MHz, CDCl$_3$, δ): 154.1, 145.1, 142.2, 137.1, 126.6, 123.4, 115.1, 114.7, 55.3; IR: 3455, 3371 cm$^{-1}$ (N—H stretch), 2966, 2920, 2845 cm$^{-1}$ (OCH$_3$, C—H stretch).

Step C: N,N-Bis(4-nitrophenyl)-N',N'-di(4-methoxyphenyl)-1,4-phenyl enedi amine

Prepared as described in Liou, G.; Chang, C. Macromolecules 2008, 41, 1667-1674. Cesium fluoride (247 mg, 1.62 mmol, 2.2 eq) in 4 mL DMSO was stirred at room temperature. 4-amino-4',4"-dimethoxytriphenylamine (240 mg, 0.75 mmol, 1.1 eq) and 4-fluoronitrobenzene (165 µL=220 mg, 1.56 mmol, 2 eq) were added in sequence and the reaction mixture was stirred at 120° C. After 24 h, the mixture was slowly poured into 50 mL of stirred H₂O and the precipitation filtered. The crude product was recrystallized from DMF/MeOH (315 mg, 75%).

¹H-NMR (300 MHz, DMSO-d6, δ): 8.16 (d, 4H), 7.19 (d, 4H), 7.11 (d, 4H), 7.04 (d, 2H), 6.93 (d, 4H), 6.77 (d, 2H), 3.73 (s, 6H, OCH₃); ¹³C-NMR (75 MHz, DMSO-d6, δ): 156.5, 151.9, 147.8, 141.8, 139.6, 135.5, 128.8, 127.7, 125.8, 122.0, 119.4, 115.3, 55.5; IR: 2934, 2834 (OCH₃, C—H stretch), 1581, 1311 (NO₂ stretch)

Step D: N,N-Bis(4-aminophenyl)-N',N'-di(4-methoxyphenyl)-1,4-phenylenediamine

N,N-Bis(4-nitrophenyl)-N',N'-di(4-methoxyphenyl)-1,4-phenylenediamine (1.6 g, 2.84 mmol, 1 eq) was dissolved in 45 mL acetonitrile and 50 mL ethanol and tin(II)dichloride (14.1 g, 62.6 mmol, 22 eq) was added. The reaction mixture was stirred at 80° C. over night. After cooling ethyl acetate was added and the mixture washed with brine and NaHCO3. The organic phase was dried over Na2SO4 and concentrated under reduced pressure. After column chromatography on silica the title compound was obtained (1.4 g, 70%).

¹H-NMR (300 MHz, DMSO-d6, δ): 6.85 (d, 4H), 6.80 (d, 4H), 6.77 (d, 4H), 6.70 (d, 2H), 6.56 (d, 2H), 6.50 (d, 4H), 4.50 (bs, 4H, NH₂), 3.73 (s, 6H, OCH₃); ¹³C-NMR (75 MHz, DMSO-d6, δ): 154.6, 145.3, 144.9, 141.8, 139.6, 136.6, 127.7, 124.6, 124.4, 118.9, 115.0, 114.9, 55.4; IR: 3434, 3360 cm⁻¹ (N—H stretch), 2947, 2832 cm⁻¹ (OCH₃, C—H stretch)

Step E: Polymerization

Prepared as described in Liou, G.; Chang, C. Macromolecules 2008, 41, 1667-1674. N,N-Bis(4-aminophenyl)-N',N'-di(4-methoxyphenyl)-1,4-phenylenediamine (0.1 g, 0.2 mmol, 1 eq), terephthalic acid (33 mg, 0.2 mmol, 1 eq), calcium chloride (24 mg, 0.21 mmol, 1 eq) were dissolved in 0.19 mL NMP and evacuated while stirring. Pyridine (0.1 mL, 1.24 mmol, 6 eq) was added and the mixture heated to 100° C. At this temperature triphenyl phosphite (0.17 g, 0.77 mmol, 3.6 eq) was added, the reaction mixture stirred for four hours and then added dropwise to cold methanol (129 mg, 97%).

¹H-NMR (300 MHz, DMSO-d6, δ): 10.40 (s, 2H, —NH—CO—), 8.11 (s, 4H), 7.70 (d, 4H), 7.00 (d, 8H), 6.88 (d, 6H), 6.77 (d, 2H), 3.72 (s, 6H, OCH₃); ¹³C-NMR (75 MHz, DMSO-d6, δ): 164.7, 155.5, 144.0, 143.7, 140.8, 137.6, 133.8, 127.8, 126.1, 125.3, 123.3, 122.0, 115.1, 55.4; IR: 3312 cm⁻¹ (N—H stretch), 3037 cm⁻¹ (aromatic C—H stretch), 2932, 2833 cm⁻¹ (OCH₃, C—H stretch), 1654 cm⁻¹ (amide carbonyl), 1239 cm⁻¹ (asymmetric stretch C—O—C), 1034 cm⁻¹ (symmetric stretch C—O—C).

Electrode Example 1—Lithium-Ion Battery

A slurry containing 25 wt-% compound 1, 55 wt-% Super P and 20 wt-% PVdF (polyvinylidene difluoride) binder in NMP was cast on carbon-coated aluminum foil (current collector) by doctor blading (the percentages relate in each case to the total weight of the solids in the slurry, without taking into account the weight of NMP).

Electrodes were die cut, dried and assembled in Swagelok cells, containing Lithium as anode and reference electrode, a Freudenberg 2190 separator, ethylene carbonate/diethyl carbonate (3/7, v/v) containing 1M LiPF₆ as electrolyte. Comparative Electrode Example 1

A slurry containing 10 wt-% of a comparative compound (see structure below), 80 wt-% Super P and 10 wt-% PVdF (polyvinylidene difluoride) binder in NMP was cast on aluminum foil (current collector) by doctor blading (the percentages each relate to the total weight of the solids in the slurry without taking into account the weight of NMP).

Electrodes were die cut, dried and assembled in Swagelok cells, containing Lithium as anode and reference electrode, a Freudenberg 2190 separator, ethylene carbonate/diethyl carbonate (3/7, v/v) containing 1M LiPF₆ as electrolyte.

(comparative compound)

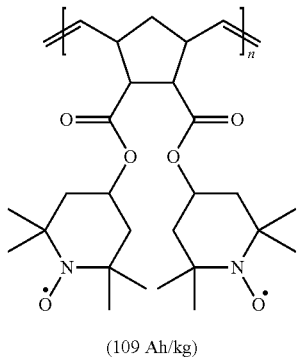

(109 Ah/kg)

Figure 5:
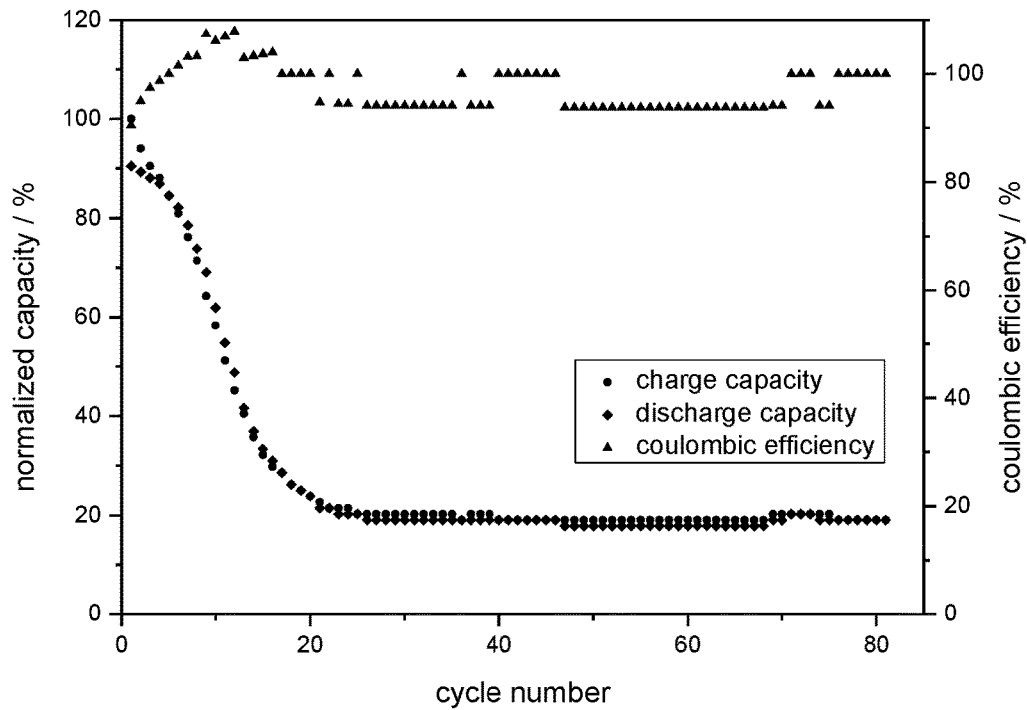
FIG. 5 shows a graph of an IU-charging test of a composite electrode of comparative electrode example 1, where the half-cell is charged with a constant current of 1 C until the cut-off voltage of 4 V (vs. Li/Li*) is reached. The half-cell is held at 4 V (vs. Li/Li*) for 1 h and then discharged with a constant current of 1 C.

FIG. 5 shows a graph of an IU-charging test of a composite electrode of comparative electrode example 1, where the half-cell is charged with a constant current of 1 C until the cut-off voltage of 4 V (vs. Li/Li⁺) is reached. The half-cell is held at 4 V (vs. Li/Li⁺) for 1 h and then discharged with a constant current of 1 C.

Electrode Example 2—Supercapacitor

A slurry containing 22 wt-% of compound 1, 5 wt-% Super P (carbon black, a conductivity improving additive), 5 wt-% PVdF (polyvinylidene difluoride) binder in NMP and 68 wt.-% of an activated carbon was cast on carbon-coated aluminum foil (current collector) by doctor blading (the percentages each relate to the total weight of the solids in the slurry without taking into account the weight of NMP). Electrodes were die cut and dried.

To produce a supercapacitor, some of the obtained positive electrodes were combined with negative carbon electrodes. Positive and negative electrodes were separated by a polyole-fine separator. The carbon electrodes had been prepared using a slurry containing 6 wt-% Super P (a conductivity enhancer), 6 wt-% PVdF binder in NMP and 88 wt.-% of an activated carbon.

The obtained positive electrodes have been compared to classical carbon supercapacitor electrodes. For characterization, as organic electrolyte ethylene carbonate/diethyl carbonate (3/7, v/v) containing 1M LiPF₆ was used.

Figure 6:
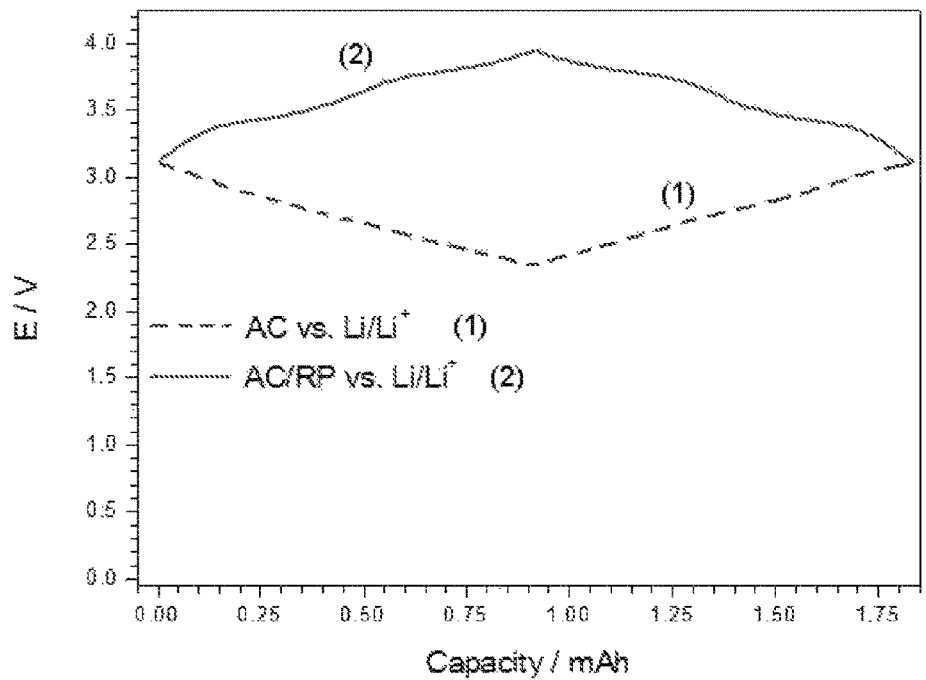
FIG. 6 shows a graph wherein the voltage curves correspond to charge/discharge processes, one conducted with the obtained positive electrode comprising compound 1 (2), the other conducted with a classical carbon supercapacitor electrode (1).

FIG. 6 shows a graph wherein the voltage curves correspond to charge/discharge processes, one conducted with the obtained positive electrode comprising compound 1 (2), the other conducted with a classical carbon supercapacitor electrode (1).

Electrode Example 3—Lithium-Ion Battery

A slurry containing 5 wt-% compound 1, 5 wt-% Super P, 85 wt-% lithium-iron phosphate and 5 wt-% PVdF (polyvinylidene difluoride) binder in NMP was cast on carbon-coated aluminum foil (current collector) by doctor blading (the percentages each relate to the total weight of the solids in the slurry, without taking into account the weight of NMP).

Electrodes were die cut, dried and assembled in Swagelok cells, containing Lithium as anode and reference electrode, a Freudenberg 2190 separator, ethylene carbonate/diethyl carbonate (3/7, v/v) containing 1M $LiPF_6$ as electrolyte. The cell showed good cyclability.

Electrode Example 4—Lithium-Ion Battery

A slurry containing 7.5 wt-% compound 1, 5 wt-% Super P and 87.5 wt-% lithium-iron phosphate in NMP was cast on carbon-coated aluminum foil (current collector) by doctor blading (the percentages each relate to the total weight of the solids in the slurry, without taking into account the weight of NMP).

Electrodes were die cut, dried and assembled in Swagelok cells, containing Lithium as anode and reference electrode, a Freudenberg 2190 separator, ethylene carbonate/diethyl carbonate (3/7, v/v) containing 1M $LiPF_6$ as electrolyte. The cell showed good cyclability.

The invention claimed is:
1. A secondary lithium-ion battery or supercapacitor electrode comprising a polymeric material containing or composed of subunits according to general formulae (I) and/or (II):

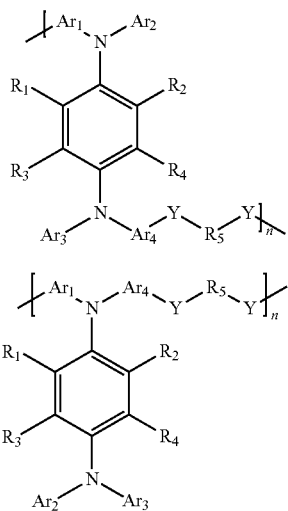

wherein
n is an integer ≥2,
Y represents —NH—CO— or —CO—NH— as an amide group, —O—CO— or CO—O— as an ester group or —NH—CO—O— or —O—CO—NH— as a urethane group,
$R^1$, $R^2$, $R^3$ and $R^4$ each independently represent H, alkyl, alkoxy, halogen or —CN,
$Ar_1$ and $Ar_4$ independently represent a bridging aryl group,
$Ar_2$ and $Ar_3$ independently represent a non-bridging aryl group, and
$R_5$ is a bridging alkyl, alkene or aryl group, wherein $Ar_1$ and $Ar_4$ in structures (I) and (II) independently represent a bridging aryl group of formula (IIIa), (IIIb) or (IIIc):

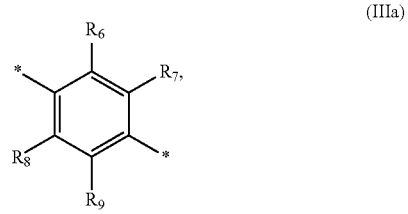

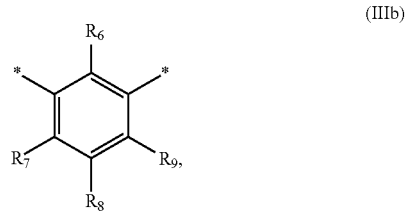

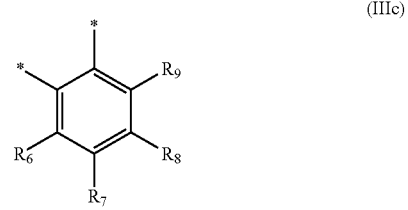

wherein
* marks a point of attachment, and
$R_6$, $R_7$, $R_8$ and $R_9$ each independently represent H, alkyl, alkoxy, halogen or —CN and wherein $R_5$ represents one of groups of formulae (IVa) to (IVn):

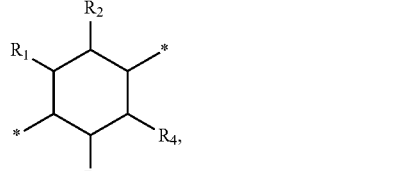

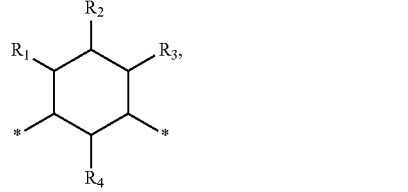

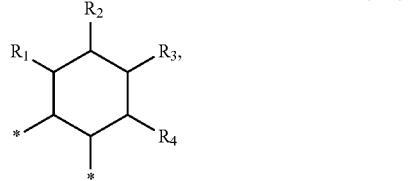

(IVe) 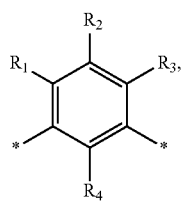

(IVf) 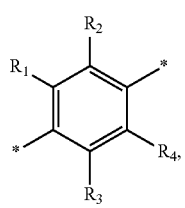

(IVg) 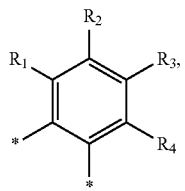

(IVh) 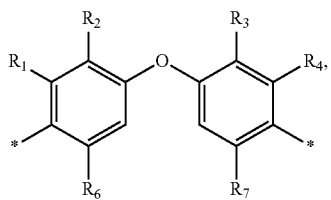

(IVi) 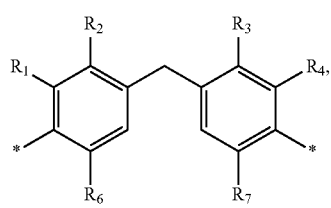

(IVj) 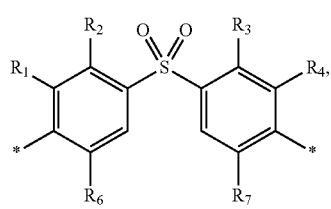

(IVk) 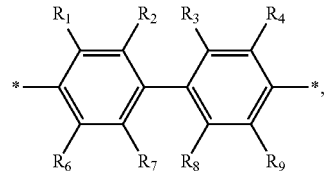

(IVl) 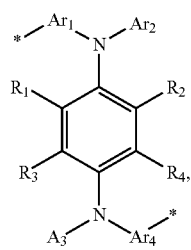

(IVm) 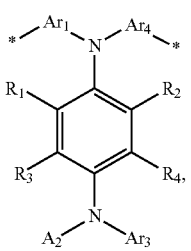

(IVn) 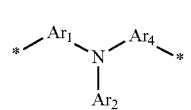

wherein
* marks a point of attachment,
m=1 to 20, and
$R_1, R_2, R_3, R_4, R_6, R_7, R_8, R_9, Ar_1, Ar_2, Ar_3$ and $Ar_4$ have the same meaning as before.

2. The electrode according to claim 1, wherein $Ar_2$ and $Ar_3$ in structures (I) and (II) independently represent a non-bridging aryl group of formula (V):

(V) 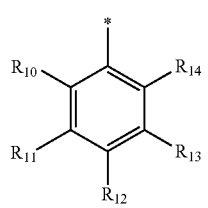

wherein
$R_{10}, R_{11}, R_{12}, R_{13}$ and $R_{14}$ each independently represent H, alkyl, alkoxy, halogen, CN or one of the groups of formulae (VIa) and (VIb):

(VIa) 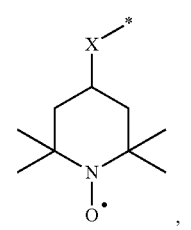

-continued

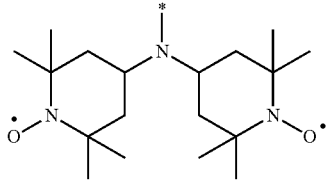

(VIb)

wherein
* marks a point of attachment, and
X represents O or NH.

3. The electrode according to claim 1, further comprising at least one carbon material selected from the group consisting of carbon black, graphite, carbon nanotubes and graphene.

4. The electrode according to claim 1, further comprising at least one electrode binder selected from the group consisting of a cellulose-based binder, a polyacrylate-based binder and a polyvinyliden-based binder.

5. A secondary lithium-ion battery comprising an electrode according to claim 1 or a polymeric material containing or being composed of subunits according to general formulae (I) and (II).

6. A supercapacitor comprising the electrode according to claim 1 or a polymeric material containing or being composed of subunits according to general formulae (I) and (II).

7. The electrode according to claim 2, further comprising at least one carbon material selected from the group consisting of carbon black, graphite, carbon nanotubes and graphene.

8. The electrode according to claim 2, further comprising at least one electrode binder selected from the group consisting of a cellulose-based binder, a polyacrylate-based binder and a polyvinylidene-based binder.

9. The electrode according to claim 3, further comprising at least one electrode binder selected from the group consisting of a cellulose-based binder, a polyacrylate-based binder and a polyvinylidene-based binder.

10. A secondary lithium-ion battery comprising an electrode according to claim 2 or a polymeric material containing or being composed of subunits according to general formulae (I) and (II).

11. A secondary lithium-ion battery comprising an electrode according to claim 3 or a polymeric material containing or being composed of subunits according to general formulae (I) and (II).

12. A secondary lithium-ion battery comprising an electrode according to claim 4 or a polymeric material containing or being composed of subunits according to general formulae (I) and (II).

13. A supercapacitor comprising the electrode according to claim 2 or a polymeric material containing or being composed of subunits according to general formulae (I) and (II).

14. A supercapacitor comprising the electrode according to claim 3 or a polymeric material containing or being composed of subunits according to general formulae (I) and (II).

15. A supercapacitor comprising the electrode according to claim 4 or a polymeric material containing or being composed of subunits according to general formulae (I) and (II).

16. A supercapacitor comprising the electrode according to claim 5 or a polymeric material containing or being composed of subunits according to general formulae (I) and (II).

17. The supercapacitor according to claim 6, further comprising an organic electrolyte.

18. The battery according to claim 5, further comprising an organic electrolyte.

19. The electrode according to claim 1, wherein alkyl is at least one selected from the group consisting of —$CH_3$ and —$C_2H_5$.

20. The electrode according to claim 2, wherein alkyl is at least one selected from the group consisting of —$CH_3$ and —$C_2H_5$.

* * * * *